United States Patent
Taya et al.

(10) Patent No.: US 6,639,984 B1
(45) Date of Patent: Oct. 28, 2003

(54) FEEDER CIRCUIT

(75) Inventors: Takashi Taya, Tokyo (JP); Masaru Sekiguchi, Tokyo (JP); Masao Kamio, Tokyo (JP); Shigeo Abe, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/316,116

(22) Filed: May 20, 1999

(30) Foreign Application Priority Data

May 20, 1998 (JP) ............................................. 10-138103

(51) Int. Cl.[7] .............................................. H04M 19/00
(52) U.S. Cl. ......................................... 379/413; 379/324
(58) Field of Search ................................. 379/324, 413

(56) References Cited

U.S. PATENT DOCUMENTS

| | | | | |
|---|---|---|---|---|
| 4,425,512 A | * | 1/1984 | Tomooka et al. | 379/413 |
| 4,598,173 A | * | 7/1986 | Chea et al. | 379/413 |
| 4,704,670 A | * | 11/1987 | Gradl et al. | 379/413 |

FOREIGN PATENT DOCUMENTS

JP    58-151168    8/1983

\* cited by examiner

Primary Examiner—Forester W. Isen
Assistant Examiner—Daniel Swerdlow
(74) Attorney, Agent, or Firm—Venable; James R. Burdett

(57) ABSTRACT

The feeder circuit to which the present invention pertains comprises means for regulating which serves to feed an electric current to a positive output terminal and a negative output terminal; means for feeding electric current which serves to feed an electric current to the means for regulating; means for regulator control which serves to control the electric current output from the means for regulating; a first resistance located between the negative terminal of the means for feeding electric current and the positive output terminal; and a second resistance located between the positive terminal of the means for feeding electric current and the negative output terminal. The provision of the first and second resistances allows the median value of the potential at the positive output terminal and the potential at the negative output terminal to be controlled in such a manner as to ensure that it tallies with the median value of the potential at the positive terminal of the means for feeding electric current and the potential at the negative terminal thereof, while also absorbing any imbalance between the current at the positive output terminal and the current at the negative output terminal.

15 Claims, 15 Drawing Sheets

FEEDER CIRCUIT

BACKGROUND OF THE INVENTION

1. Field of the Invention

The present invention relates to a feeder circuit. The feeder circuit to which the present invention pertains may be employed, for instance, as a subscriber circuit in an electronic exchange or as an office channel circuit in a digital subscriber line transmission system.

2. Description of Related Art

In a normal telephone communications network the subscriber's terminal unit and the exchange's subscriber circuit are connected by a subscriber line. Each subscriber circuit has one terminal unit allocated to it, and each subscriber line has two wires.

The subscriber circuit transmits call signals to the terminal unit, receives and transmits voice signals, feeds direct-current and monitors the fed current, by way of the subscriber line. The feeding and monitoring of the current are performed by a feeder circuit provided within the subscriber circuit.

In a normal feeder circuit, the two wires of the subscriber circuit and the power source are connected by means for a transformer. A transformer is employed in order to 'float' the wires free of the power source. In this manner the wires are not easily affected by fluctuations in earth potential, and by line damage. This transformer feeds an electric current to one of the two wires and takes it in from the other.

The current which is output from the feeder circuit to the one wire and that which is input to the feeder circuit from the other wire are set at the same value. This is because any imbalance in the values of these currents would render it impossible to use the wires for the transmission and reception of control signals. However, current leaks from both the wires, as a result of which there is a need for means for absorbing the imbalance between the two values of current.

It sometimes happens that a conventional feeder circuit ceases to perform correctly when a high-voltage common-mode signal is impressed in the form of noise. In other words, when a common-mode signal is impressed, it becomes impossible to absorb the imbalance between the currents passing through the two wires, moreover it is no longer possible to employ the wires for the transmission and reception of control signals. For instance, the location of a commercial power line in the vicinity of the subscriber line may easily cause a high-voltage common-mode signal to be impressed. The commercial power line may impress a common-mode signal of 10 volt or more on the subscriber line.

It is possible to control the occurrence of imbalances resulting from common-mode signals without 'floating' the two wires free of the power supply. However, as has already been pointed out, this means that the wires are easily affected by fluctuations in earth potential, and by line damage.

SUMMARY OF THE INVENTION

It is an object of the present invention to provide a feeder circuit wherein the subscriber line is 'floated' free of the power supply, and imbalances resulting from high-voltage common-mode signals do not easily occur.

To this end, the feeder circuit to which the present invention pertains comprises means for regulating which serves to feed an electric current to a positive output terminal and a negative output terminal; first means for feeding electric current which serves to feed an electric current to the means for regulating; means for regulator control which serves to control the electric current output from the means for regulating; and means for output control which serves to control the median value of the potential at the positive output terminal and the potential at the negative output terminal in such a manner as to ensure that it tallies with the median value of the potential at the positive terminal of the means for feeding electric current and the potential at the negative terminal thereof, while also absorbing any imbalance between the current at the positive output terminal and the current at the negative output terminal.

BRIEF DESCRIPTION OF THE DRAWINGS

Further objects and advantages of the present invention will be described with reference to the following appended drawings.

DESCRIPTION OF THE PREFERRED EMBODIMENTS

Figure 1:
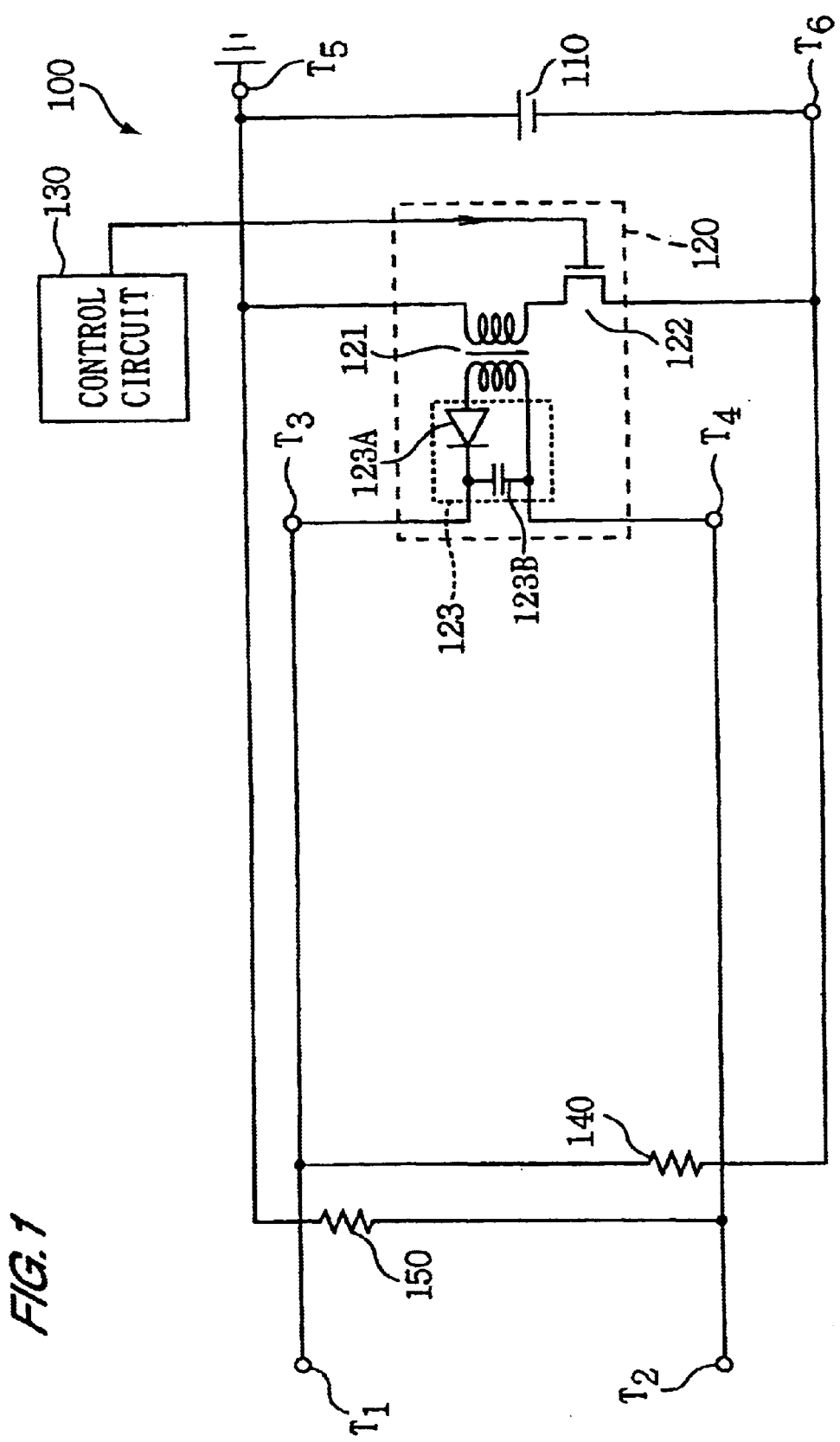
FIG. 1 is a circuitry diagram illustrating a first embodiment of the feeder circuit to which the present invention pertains.

There follows a detailed description of the preferred embodiments of the present invention with reference to the attached drawings. It should be noted that the dimensions, shape and positional relationship of each component part as illustrated in the drawings are simply approximations designed to facilitate understanding of the present invention. Similarly, the numerical conditions described below are only in the nature of examples.

First Embodiment

We detail the first embodiment of present invention with reference to the FIG. 1.

As may be seen from FIG. 1, the feeder circuit 100 has a direct-current power supply 110, a switching regulator 120, a switching regulator control circuit 130, and resistor 140, 150.

The direct-current power supply 110 feeds electric power at constant voltage. In the power supply 110, the positive electrode is connected to terminal $T_5$, and the negative electrode to terminal $T_6$. In addition, terminal $T_5$ is grounded.

The switching regulator 120 is equipped with a transformer 121, a switching element 122 and a smoothing circuit 123. The transformer 121 is employed in order to allow the wires connected to terminals $T_1$, $T_2$, to 'float' free of the power supply 110. One end of the primary coil of the transformer 121 is connected to the power supply terminal $T_5$, the other by way of the switching element 122 to the power supply terminal $T_6$. The secondary coil of the transformer 121 is connected to the smoothing circuit 123. The switching element 122 is controlled by the control circuit 130, and serves to alter the current flowing to the primary coil of the transformer 121. The mutual induction effect which results from these changes in the current causes a current to be generated in the secondary coil of the transformer 121. The smoothing circuit 123 has a diode 123A and a capacitor 123B. The cathode of the diode 123A is connected to one end of the secondary coil, while the capacitor 123B is connected between the anode of the diode 123A and the secondary coil. This smoothing circuit 123 serves to rectify the electric current generated in the secondary coil of the transformer 121. In the smoothing circuit 123, the current is input from a positive terminal $T_3$, and output from a negative terminal $T_4$. Terminals $T_3$, $T_4$ of the smoothing circuit 123 are connected to terminals $T_1$, $T_2$ of the feeder circuit 100. Terminals $T_1$, $T_2$ are connected to the two wires of the subscriber line (not depicted in the drawing).

The switching regulator control circuit 130 generates a control current which is fed to the switching element 122. The control circuit 130 switches the switching element 122 on and off, thus altering the primary current of the transformer 121.

One end of the resistor 140 is connected to terminal $T_1$, and the other to terminal $T_6$. Similarly, one end of the resistor 150 is connected to terminal $T_2$, and the other to terminal $T_5$. That is to say, in the feeder circuit 100 there is continuity between terminal $T_1$ on the high potential side and the negative electrode of the power supply 110 on the one hand, and between terminal $T_2$ on the low potential side and the positive electrode of the power supply 110 on the other. The resistors 140, 150 are used in order to stabilise the median value of the potentials at terminals $T_1$, $T_2$ at a level in the vicinity of the median value of the potentials at terminals $T_5$, $T_6$. In addition, the resistors 140, 150 serve to absorb the imbalance between the current fed to the wire from terminal $T_1$ and that fed from the wire to terminal $T_2$.

The feeder circuit 100 illustrated in FIG. 1 is not equipped with means for transmitting and receiving control signals. If control signals are to be transmitted and received, the feeder circuit 100 is fitted with a circuit which superimposes the signal current on the current flowing between terminals $T_1$ and $T_3$, and another circuit which samples the signal current from the current flowing between terminals $T_2$ and $T_4$. In addition, filter circuits are fitted between terminals $T_1$ and $T_3$, and between terminals $T_2$ and $T_4$, in order to prevent input of the signal current to the regulator 120.

There follows a description of the principle behind the action of the feeder circuit 100 as illustrated in FIG. 1.

As has been explained above, the control circuit 130 switches the switching element 122 on and off in such a manner that a secondary current is generated in the transformer 121.

If the two wires of the subscriber line are not connected to terminals $T_1$, $T_2$, the current output from terminal $T_3$ of the regulator 120 passes through the resistors 140 to reach the power supply 110, meanwhile, the current output from the power supply 110 passes through terminal $T_5$ and the resistor 150, and is input to the regulator 120. In this case, the values of current at terminal $T_3$ and that at terminal $T_4$ are equal, with the result that the values of current at the resistor 140 and that at the resistor 150 are also equal. Consequently, the relationship between the resistance levels $R_{140}$, $R_{150}$ at the resistors 140, 150 and potential $V_1$, $V_2$, $V_5$, $V_6$ at terminals $T_1$, $T_2$, $T_5$, $T_6$ fulfils the condition of the following formula (1).

$$\frac{V_1 - V_6}{R_{140}} = \frac{V_5 - V_2}{R_{150}} \quad (1)$$

Thus, when $R_{140}$ and $R_{150}$ in formula (1) tally, the relationship between $V_1$, $V_2$, $V_5$, $V_6$ fulfils the condition of formula (2) below. In other words, the median value of the potentials at terminals $T_1$, $T_2$ is fixed at the median value of the potentials at terminals $T_5$, $T_6$.

$$\frac{V_1 + V_2}{2} = \frac{V_5 + V_6}{2} \quad (2)$$

Meanwhile, if the subscriber line is connected to terminals $T_1$, $T_2$, the current output from terminal $T_3$ passes through terminal $T_1$ to reach one of the wires, and the current input from the other wire passes through terminal $T_2$ to reach terminal $T_4$. Since current leaks from both the wires, the value of the electric current output from terminal $T_3$ does not tally with that input to terminal $T_4$. Consequently, in this case, the condition of formula (2) is not fulfilled. However, if leak impedance is in the vicinity of 1 megohm, setting the resistance levels $R_{140}$, $R_{150}$ in the vicinity of one kiloohm makes it possible to ensure that the amount of fluctuation in the median value of the potentials at terminals $T_1$, $T_2$ is within roughly 10% of the median value of the potentials at terminals $T_5$, $T_6$.

That is to say, the resistors 140, 150 are capable of stabilising the median value of the potentials at terminals $T_1$, $T_2$, and consequently the potentials at terminals $T_1$, $T_2$ as such.

If a high-potential common-mode alternating-current induced voltage is impressed on one of the wires, it sometimes happens that the potentials at terminals $T_1$, $T_2$ fluctuate in relation to those at terminals $T_5$, $T_6$, and the feeder circuit 100 ceases to function normally. In the feeder circuit 100 there is continuity between terminal $T_1$ on the high potential side and terminal $T_6$ on the one hand, and between terminal $T_2$ and terminal $T_5$ on the other. Thus, the question of whether or not the feeder circuit 100 functions in a stable manner is determined by the relationship between the potential $V_1$ at terminal $T_1$ and the potential $V_6$ at terminal $T_6$, and by that between the potential $V_2$ at terminal $T_2$ and the potential $V_5$ at terminal $T_5$. Depending on the common-mode voltage, if the potential $V_2$ at terminal $T_2$ becomes greater than the potential $V_5$ at terminal $T_5$, or if the potential $V_1$ at terminal $T_1$ becomes smaller than the potential $V_6$ at terminal $T_6$, the feeder circuit 100 will not function normally. Consequently, the conditions for the normal operation of the feeder circuit 100 are $V_2<V_5$ and $V_1>V_6$. In other words, the maximum level of common-mode voltage at which no malfunctioning of the feeder circuit 100 will occur is expressed by the following formula (3).

$$\frac{V_5 - V_6}{2} + \frac{V_1 - V_2}{2} \quad (3)$$

In order to suppress imbalance resulting from current leak, it is also possible to connect terminals $T_1$, $T_5$ on the high potential side by way of a resistor, and to connect terminals $T_2$, $T_6$ by way of a resistor. The question of whether or not this feeder circuit functions in a stable manner when impressed with common-mode voltage is determined by the relationship between the potential $V_1$ at terminal $T_1$ and the potential $V_5$ at terminal $T_5$, and by that between the potential $V_2$ at terminal $T_2$ and the potential $V_6$ at terminal $T_6$. Depending on the common-mode voltage, if the potential $V_1$ at terminal $T_1$ becomes greater than the potential $V_5$ at terminal $T_5$, or if the potential $V_2$ at terminal $T_2$ becomes smaller than the potential $V_6$ at terminal $T_6$, the feeder circuit 100 will not function normally. Consequently, the conditions for the normal operation of the feeder circuit 100 are $V_1<V_5$ and $V_2>V_6$. In other words, the maximum level of common-mode voltage at which no malfunctioning of the feeder circuit 100 will occur is expressed by the following formula (4).

$$\frac{V_5 - V_6}{2} - \frac{V_1 - V_2}{2} \quad (4)$$

In the feeder circuit 100, $V_1>V_2$, and $V_5>V_6$. Hence, the maximum level provided by formula (3) is always greater than that provided by formula (4). For instance, if $V_5=0[V]$, $V_6=-48[V]$, $V_1-V_2=20[V]$, the level according to formula (3) is 34[V], while that according to formula (4) is 14[V].

Consequently, the provision of the resistor 140 between terminals $T_1$ and $T_6$, and the resistor 150 between terminals $T_2$ and $T_5$ ensures excellent protection against common-mode voltage.

Second Embodiment

Figure 2:
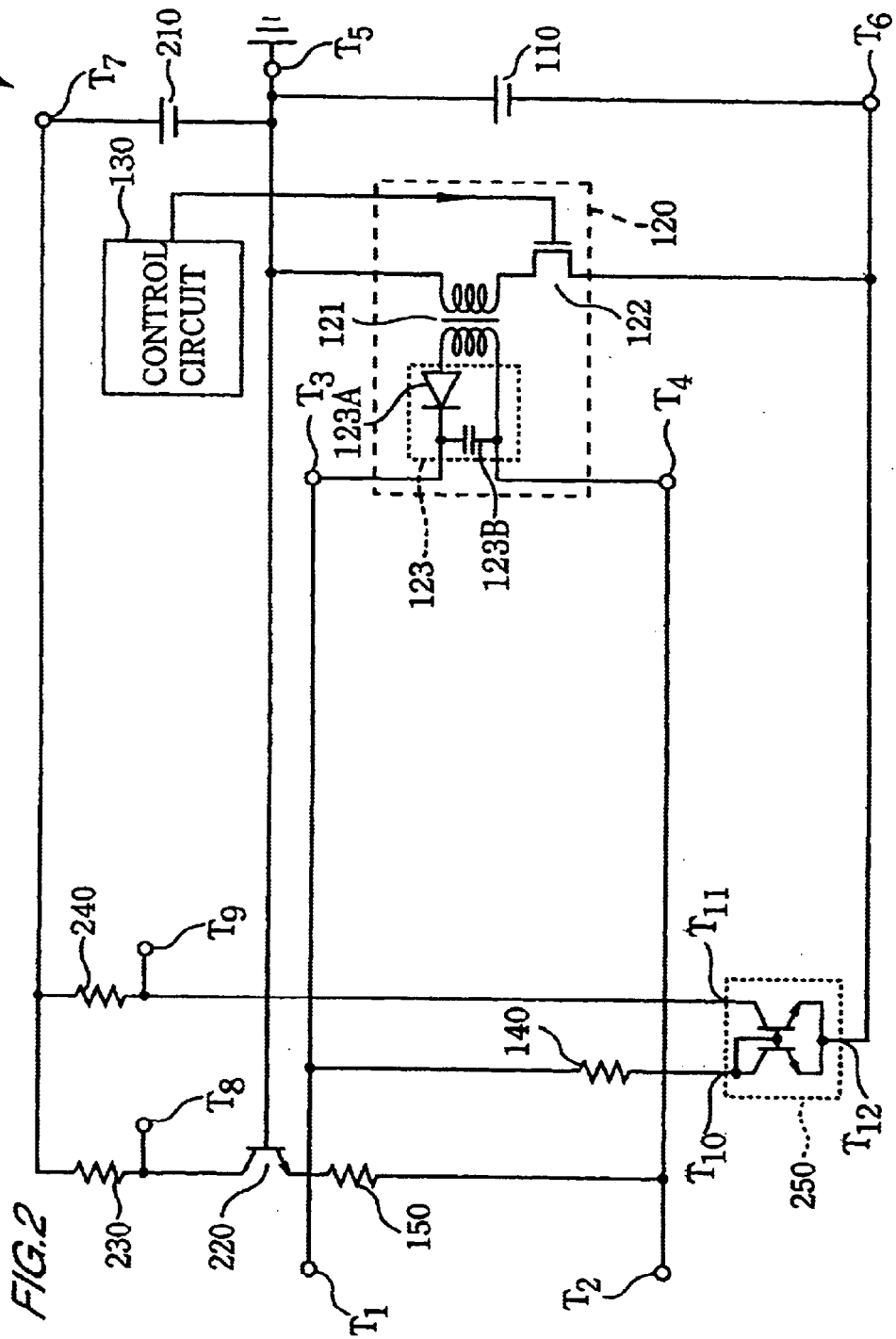
FIG. 2 is a circuitry diagram illustrating a second embodiment of the feeder circuit to which the present invention pertains.

We detail the second embodiment of present invention with reference to the FIG. 2. The feeder circuit 200 in the present embodiment differs from the abovementioned first embodiment in that a circuit is provided in order to monitor the subscriber line potential.

Those constituent elements of the feeder circuit 200 illustrated in FIG. 2 which are the same as those illustrated in FIG. 1 have been allocated the same codes.

The direct-current power supply 210 has a positive electrode which is connected to terminal $T_7$, and a negative electrode which is connected to terminal $T_5$. This direct-current power supply 210 outputs electricity at a constant direct-current voltage.

The collector of the npn-type bipolar transistor 220 is connected by way of a resistor 230 to terminal $T_7$, while the base is connected to terminal $T_5$, and the emitter via the resistor 150 to terminal $T_2$. This transistor 220 has an ample ratio of change of the collector current in relation to the base current, which is to say an ample current amplification factor, and the collector current and emitter current can be regarded as being essentially the same. The potential difference between base and emitter in the transistor 220 is very small, and may be disregarded. The transistor 220 applies the same potential as terminal $T_5$ to the point of connection between the emitter and the resistor 150, applying an electric current to the resistor 150. The same value of electric current as that flowing through the resistor 150 is applied to the resistor 230. The electric current flowing through the resistor 230 is applied from terminal $T_7$, and reaches terminal $T_2$ by way of the resistor 150. Lowering of the voltage in the resistor 230 means that the collector potential of the transistor 220 is lower than the potential of the power supply 210.

The current mirror circuit 250 comprises two npn-type bipolar transistors. The collector current of the two transistors in the current mirror circuit 250 is the same, with the result that terminals $T_{10}$, $T_{11}$ have the same value of current. The sum of the terminals $T_{10}$, $T_{11}$ tallies with the value of current at terminal $T_{12}$. The potential difference between collector and emitter in the two transistors is very small, and may be disregarded. The current mirror circuit 250 applies the same potential as terminal $T_6$ to the point of connection between one of the transistors and the resistor 140, supplying an electric current to the resistor 140, and supplies the same value of current as the resistor 140 to the resistor 240. The electric current flowing through the resistor 140 is supplied from terminal $T_1$, and reaches terminal $T_6$ by way of terminal $T_{10}$, the current mirror circuit 250 and terminal $T_{12}$. The electric current flowing through the resistor 240 is supplied from terminal $T_7$, and reaches terminal $T_6$ by way of terminal $T_{10}$, the current mirror circuit 250 and terminal $T_{12}$. Lowering of the voltage in the resistor 240 means that the potential at terminal $T_{11}$ is lower than the potential of the power supply 210.

There follows a description of the principle behind the action of the feeder circuit 200.

A direct-current output to terminals $T_3$, $T_4$ by the control circuit 130 and regulator 120 is fed from terminals $T_1$, $T_2$ to the subscriber line.

By this direct-current, the potentials at terminals $T_1$, $T_6$ are applied to each end of the resistor 140, and those at terminals $T_5$, $T_2$ to each end of the resistor 150, as a result of which the feeder circuit 200 functions in the same manner as in the first embodiment.

The transistor 220 serves to ensure that the current flowing to the resistor 150 and that flowing to the resistor 230 are the same. Consequently, if $V_5$, $V_6$, $V_7$, $V_8$, $V_9$ are the potentials at terminals $T_5$, $T_6$, $T_7$, $T_8$, $T_9$, and $R_{150}$, $R_{230}$ are the resistances of the resistors 150, 230, the condition of the following formula (5) is fulfilled.

$$V_7 - V_8 = \frac{V_5 - V_2}{R_{150} \times R_{230}} \quad (5)$$

Here, $V_5$, $V_7$, $R_{150}$, $R_{230}$ are known entities, and there is a one-to-one correspondence between the potentials at terminals $V_2$, $V_8$. Hence, by detecting the potential at terminal $T_8$ it is possible also to detect that at terminal $T_2$.

The current mirror circuit 250 serves to ensure that the currents flowing to the resistors 140, 240 are the same.

Consequently, if $V_1, V_7, V_6, V_9$ are the potentials at terminals $T_1, T_7, T_6, T_9$, and $R_{150}, R_{230}$ are the resistances of the resistors 150, 230, the condition of the following formula (6) is fulfilled.

$$V_7 - V_9 = \frac{V_1 - V_6}{R_{150} \times R_{230}} \tag{6}$$

In formula (6), $V_6, V_7, R_{150}, R_{230}$ are known entities, and there is a one-to-one correspondence between the potentials at terminals $V_2, V_9$. Hence, by detecting the potential at terminal $T_8$ it is possible also to detect that at terminal $T_1$.

The potentials at terminals $T_1, T_2$ are important as objects of monitoring on the subscriber line. The present embodiment involves a simple circuit which allows the potentials at terminals $T_1, T_2$ to be monitored.

The present embodiment employs as the transistor 220 one which makes it possible to disregard the potential difference between base and emitter. As the two transistors of the current mirror circuit 250 it employs ones which make it possible to disregard the potential difference between collector and emitter. Modifying formulae (5) and (6) to take these potential differences into consideration will allow transistors to be employed in which it is not possible to disregard the potential differences. It should be noted, however, that the maximum permissible common-mode alternating-current induced voltage will decrease by the combined total of these potential differences.

Third Embodiment

Figure 3:
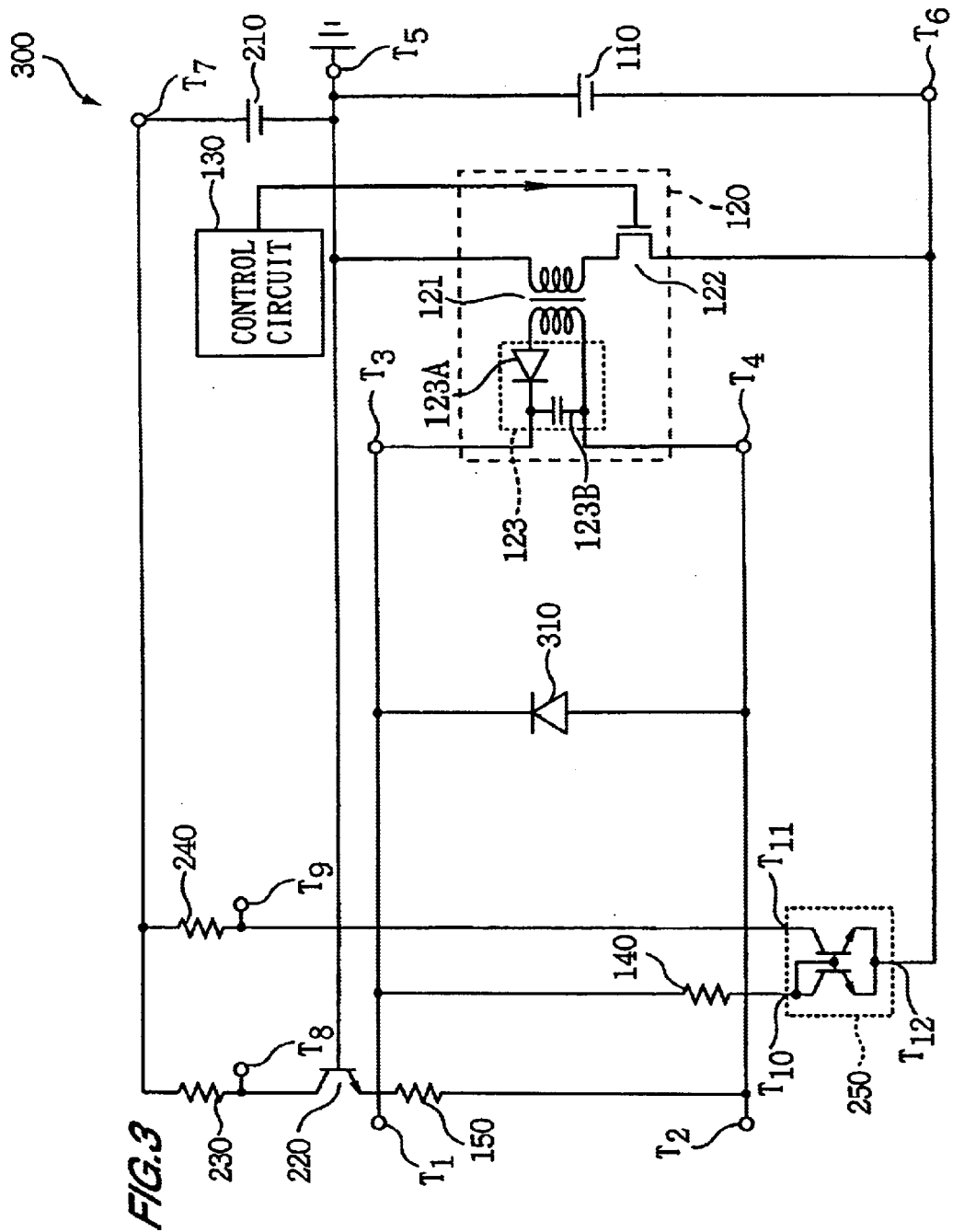
FIG. 3 is a circuitry diagram illustrating a third embodiment of the feeder circuit to which the present invention pertains.

We detail the third embodiment of present invention with reference to the FIG. 3.

Those constituent elements of the feeder circuit 300 illustrated in FIG. 3 which are the same as those illustrated in either of FIGS. 1 and 2 have been allocated the same codes.

The feeder circuit 300 in the present embodiment differs from the abovementioned second embodiment in that it is provided with a diode 310.

The cathode of the diode 310 is connected to terminal $T_3$, while the anode is connected to terminal $T_4$.

Hence, in the diode 310 the current flows from terminal $T_4$ to terminal $T_3$, but not from terminal $T_3$ to terminal $T_4$.

In the feeder circuit 300, if for instance the switching regulator 120 breaks down or ceases to function, the current flows from terminal $T_7$ by way of the resistor 230, transistor 220, resistor 150, diode 210, resistor 140 and current mirror circuit 250 to terminal $T_6$. In other words, the provision of the diode 310 in the feeder circuit 300 makes it possible to prevent the potential at terminal $T_1$ from falling below that at terminal $T_2$.

On the other hand, in the abovementioned feeder circuits 100, 200, terminals $T_1, T_6$ are simply connected by way of the resistor 140, and terminals $T_2, T_5$ by way of the resistor 150. Thus, if the switching regulator 120 breaks down or ceases to function, the potential at terminal $T_1$ will fall to the level of that at terminal $T_6$, while the potential of terminal $T_2$ will fall to the level of that at terminal $T_5$.

As has been explained above, the feeder circuit 300 of the present embodiment allows the reversal of polarity at terminals $T_1, T_2$ to be prevented at such time as the switching regulator 120 breaks down or ceases to function.

The present embodiment may be applied where it is possible to disregard a fall in potential between the anode and cathode of the diode 310. The question of whether or not it is possible to disregard this fall is determined by the specifications of the device or system on which the feeder circuit 300 is mounted.

Fourth Embodiment

Figure 4:
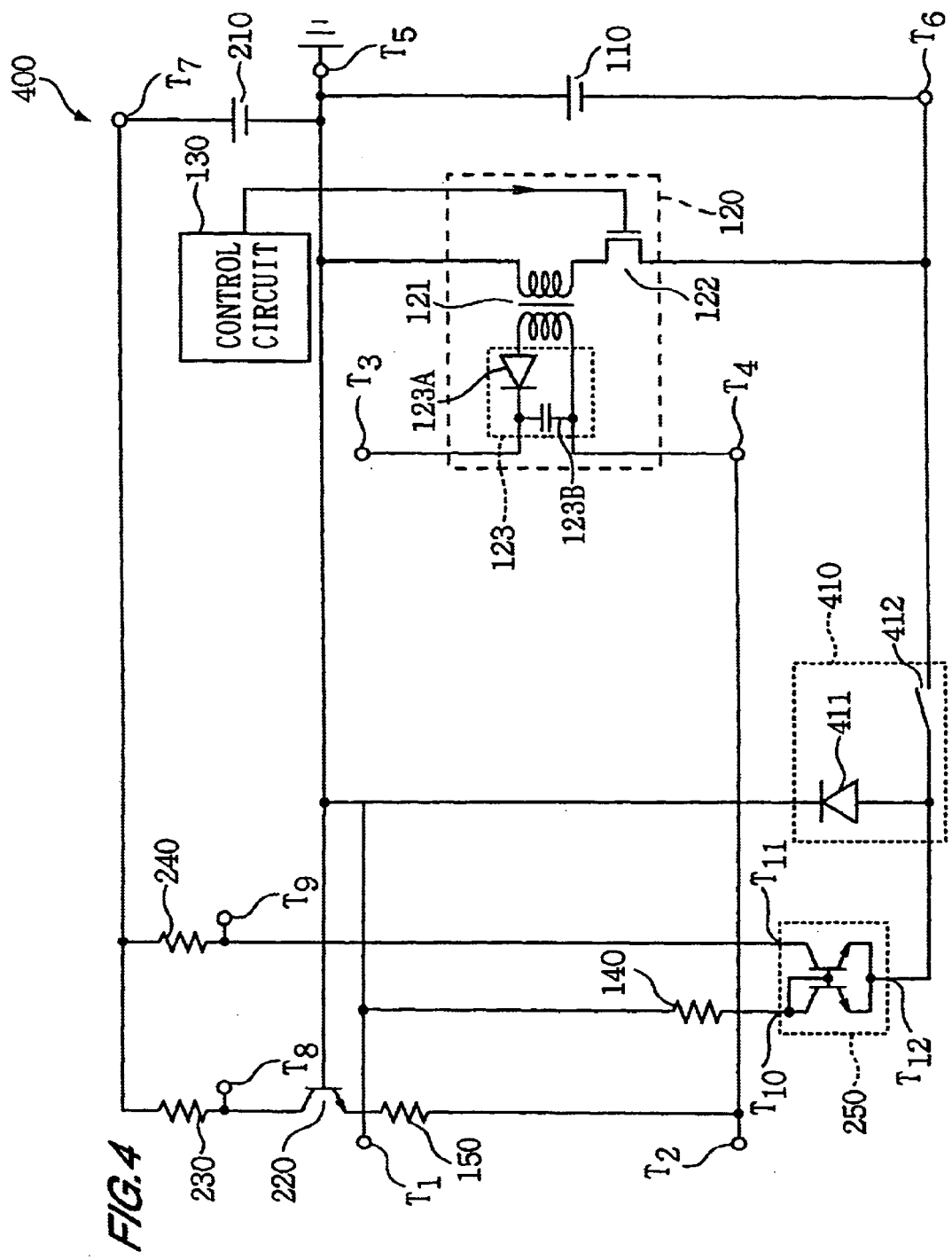
FIG. 4 is a circuitry diagram illustrating a fourth embodiment of the feeder circuit to which the present invention pertains.

We detail the fourth embodiment of present invention with reference to the FIG. 4.

Those constituent elements of the feeder circuit 400 illustrated in FIG. 4 which are the same as those illustrated in either of FIGS. 1 and 2 have been allocated the same codes.

The feeder circuit 400 in the present embodiment differs from the abovementioned second embodiment in that it is provided with a switch circuit 410.

The switch circuit 410 is provided with a diode 411 and a switch 412. The cathode of the diode 411 is connected to terminal $T_5$, while the anode is connected to terminal $T_{12}$. The switch 412 is connected between terminals $T_{12}$ and $T_6$.

Provision of the diode 411 ensures that the current flows from terminal $T_{12}$ in the direction of terminal $T_5$, but not from terminal $T_5$ in the direction of terminal $T_{12}$.

The switch 412 is opened and closed by means for control not depicted in the drawing.

In the feeder circuit 400, if the switch 412 is closed, there is continuity between terminal $T_{12}$ of the current mirror circuit 250 and terminal $T_6$ of the power supply 110, with the result that the potential at terminal $T_6$ is applied to the anode of the diode 411. Meanwhile, the potential at terminal $T_5$ is applied to the cathode of the diode 411. Hence, the cathode potential is higher than the anode potential, and the current does not flow to the diode 411. This means that the feeder circuit 400 is equivalent to the feeder circuit 100 illustrated in FIG. 1.

On the other hand, if the switch 412 is open and the subscriber line is not connected to terminals $T_1, T_2$, the current flowing outwards from the regulator 120 to terminal $T_3$ and that flowing inwards from terminal $T_4$ to the regulator 120 are equal. Hence, the same value of current as that which flows to the resistor 150 flows along a route comprising terminal $T_3$, the resistor 240, the current mirror circuit 250, the diode 411 and terminal $T_5$. Here, if $V_1, V_2, V_5$ are the potentials at terminals $T_1, T_2, T_5$, and $R_{140}, R_{150}$ are the resistances of the resistors 140, 150, the condition of the following formula (7) is fulfilled.

$$\frac{V_1 - V_5}{R_{140}} = \frac{V_5 - V_2}{R_{150}} \tag{7}$$

If in formula (7) the resistance levels of the resistors 140, 150 are equal, the condition of the following formula (8) is fulfilled.

$$\frac{V_1 + V_2}{2} = \frac{V_5 + V_5}{2} = V_5 \tag{8}$$

It will be clear from formula (8) that the median value of the potentials at terminals $T_1, T_2$ has been fixed at that of power supply terminal $T_5$.

Meanwhile, if the switch 412 is open and the subscriber line is connected to terminals $T_1, T_2$, leak impedance from the subscriber line to earth and other factors mean that the median value of the potentials at terminals $T_1, T_2$ does not tally with the potential at terminal $T_5$. However, the correct selection of the resistance levels of the resistors 140, 150 makes it possible to ensure that the median value of the potentials at terminals $T_1$, $T_2$ is in the vicinity of that at terminal $T_5$.

In other words, with the feeder circuit 400 it is possible to switch so that the median value of the potentials at terminals $T_1$, $T_2$ is either in the vicinity of the median value of the potentials at terminals $T_5$, $T_6$, or in the vicinity of the potential of terminal $T_5$. Hence, the feeder circuit 400 permits compatibility with a plurality of subscriber lines having different median potential values. The feeder circuit 400 is suitable, for example, for adoption where analogue subscriber lines and ISDN lines are used alongside one another.

In the present embodiment the connection of the resistor 140 has been switched between terminals $T_5$ and $T_6$, but it is also possible to switch the connection of the resistor 150 between terminals $T_5$ and $T_6$. If the connection of the resistor 150 is to be switched, a circuit similar to the switch circuit 410 is provided between the base of the transistor 220 and terminal $T_5$.

The present embodiment employs as the diode 411 one which makes it possible to disregard the potential difference between cathode and anode. Modifying formulae (7) and (8) to take these potential differences into consideration will allow diodes to be employed in which it is not possible to disregard the potential differences. It should be noted, however, that the maximum permissible common-mode alternating-current induced voltage will decrease by the combined total of these potential differences.

Fifth Embodiment

Figure 5:
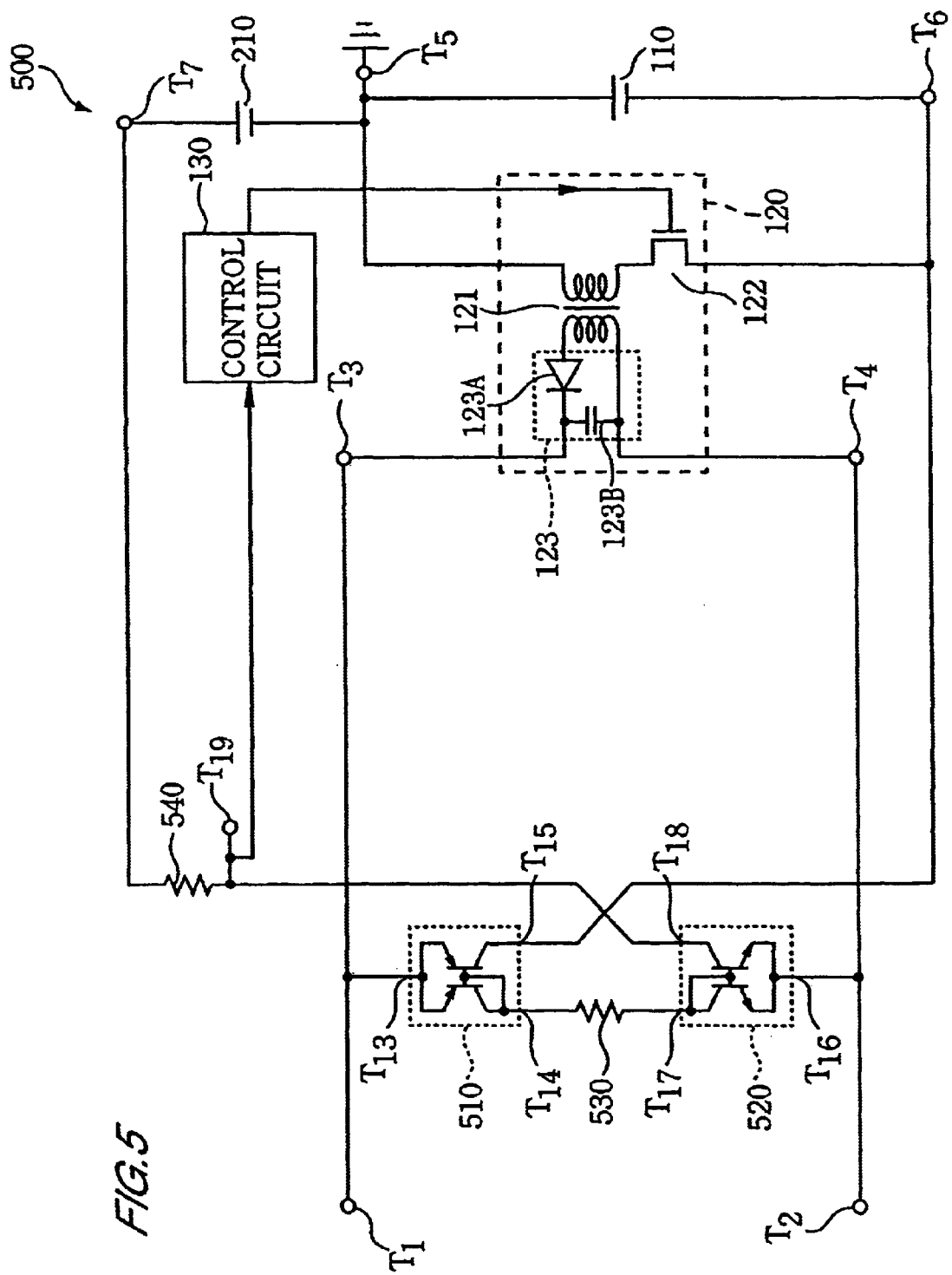
FIG. 5 is a circuitry diagram illustrating a fifth embodiment of the feeder circuit to which the present invention pertains.

We detail the fifth embodiment of present invention with reference to the FIG. 5.

Those constituent elements of the feeder circuit 500 illustrated in FIG. 5 which are the same as those illustrated in either of FIGS. 1 and 2 have been allocated the same codes.

The current mirror circuit 510 is provided with two pnp-type bipolar transistors. The emitters of these transistors are connected by terminal $T_{13}$ to terminal $T_1$, while the collector of one of them and both the bases are connected by terminal $T_{14}$ to one end of the resistor 530. The collector of the other transistor is connected by terminal $T_{15}$ to terminal $T_6$. In the current mirror circuit 510, the same value of current as flows between terminals $T_{13}$ and $T_{14}$ flows between terminals $T_{13}$ and $T_{15}$. The present embodiment employs as the two transistors of the current mirror circuit 510 ones which make it possible to disregard the potential difference between collector and emitter.

The current mirror circuit 520 is provided with two npn-type bipolar transistors. The emitters of these transistors are connected by terminal $T_{16}$ to terminal $T_2$, while the collector of one of them and both the bases are connected by terminal $T_{17}$ to the other end of the resistor 530. The collector of the other transistor is connected by terminal $T_{18}$ to one end of the resistor 540, while the other end of the resistor 540 is connected to terminal $T_7$. The potential at one end of the resistor 540 is input to the control circuit 130. Terminal $T_{18}$ is connected to signal detection terminal $T_{19}$. In the current mirror circuit 520, the same value of current as flows between terminals $T_{16}$ and $T_{17}$ flows between terminals $T_{16}$ and $T_{18}$. The present embodiment employs as the two transistors of the current mirror circuit 510 ones which make it possible to disregard the potential difference between collector and emitter.

There follows a description of the principle behind the action of the feeder circuit 500.

A direct-current power supply output to terminals $T_3$, $T_4$ by the control circuit 130 and the regulator 120 is fed by way of terminals $T_1$, $T_2$ to the subscriber line. If the potentials at terminals $T_1$, $T_2$ are $V_1$, $V_2$, the potential on the terminal $T_{14}$ side of the resistor 530 is $V_1$, and that on the terminal $T_{17}$ side is $V_2$. Thus, the current flows to the current mirror circuits 510, 520 and the resistor 530 from the terminal $T_{13}$ side towards the terminal $T_{16}$ side. What is more, the same value of current as flows to terminals $T_{13}$, $T_{14}$ also flows to terminals $T_{15}$, $T_{18}$. As a result, the voltage at terminal $T_{19}$, namely the potential $V_{19}$ of the control circuit 130, is expressed by the following formula (9), where the potentials at terminals $T_5$, $T_6$, $T_7$ are $V_5$, $V_6$, $V_7$, and the resistances of the resistors 530, 540 are $R_{530}$, $R_{540}$.

$$V_{19} = V_7 - \frac{V_1 - V_2}{R_{201} \times R_{202}} \qquad (9)$$

Here, $V_7$, $R_{530}$, $R_{540}$ are known entities. Hence, by detecting the potential at terminal $T_{19}$ it is possible also to detect the potential difference at terminals $T_1$, $T_2$.

The potential $V_{19}$ is input to the control circuit 130. The control circuit controls the regulator 120 in accordance with the input potential $V_{19}$. For instance, by controlling the pulse width of signals impressed on the switching element 122 it is possible to control the output voltage of the smoothing circuit 123. That is to say, the feeder circuit 500 can control negative feedback to the regulator 120.

The current output from the resistor 540 passes through terminals $T_{15}$, $T_{16}$, $T_4$ to be input to the smoothing circuit 123, and it further passes through terminals $T_3$, $T_{13}$, $T_{15}$ to reach terminal $T_5$. Hence, it does not cause any deterioration in the current balance of the loop formed by the path of the current.

In the feeder circuit 500, the permissible limit of common-mode alternating-current induced voltage impressed by way of terminals $T_1$, $T_2$ is determined by whether or not the current mirror circuits 510, 520 are functioning. This permissible limit is expressed by the inequalities $V_1 > V_2$ and $V_2 < V_7$. Thus, the maximum permissible level of common-mode alternating-current induced voltage is expressed by the following formula.

$$\frac{V_7 - V_6}{2} + \frac{V_1 - V_2}{2} \qquad (10)$$

For example, if $V_7=5[V]$, $V_6=-48[V]$, $V_1-V_2=20[V]$, the maximum permissible level of common-mode alternating-current induced voltage is 36.5 [V]. In other words, the feeder circuit 500 permits a high level of common-mode alternating-current induced voltage.

The present embodiment employs as the current mirror circuits 510, 520 ones which make it possible to disregard the potential difference between collector and emitter. Modifying formula (9) to take these potential differences into consideration will allow transistors to be employed in which it is not possible to disregard the potential differences. It should be noted, however, that the maximum permissible common-mode alternating-current induced voltage will decrease by the combined total of these potential differences.

Sixth Embodiment

Figure 6:
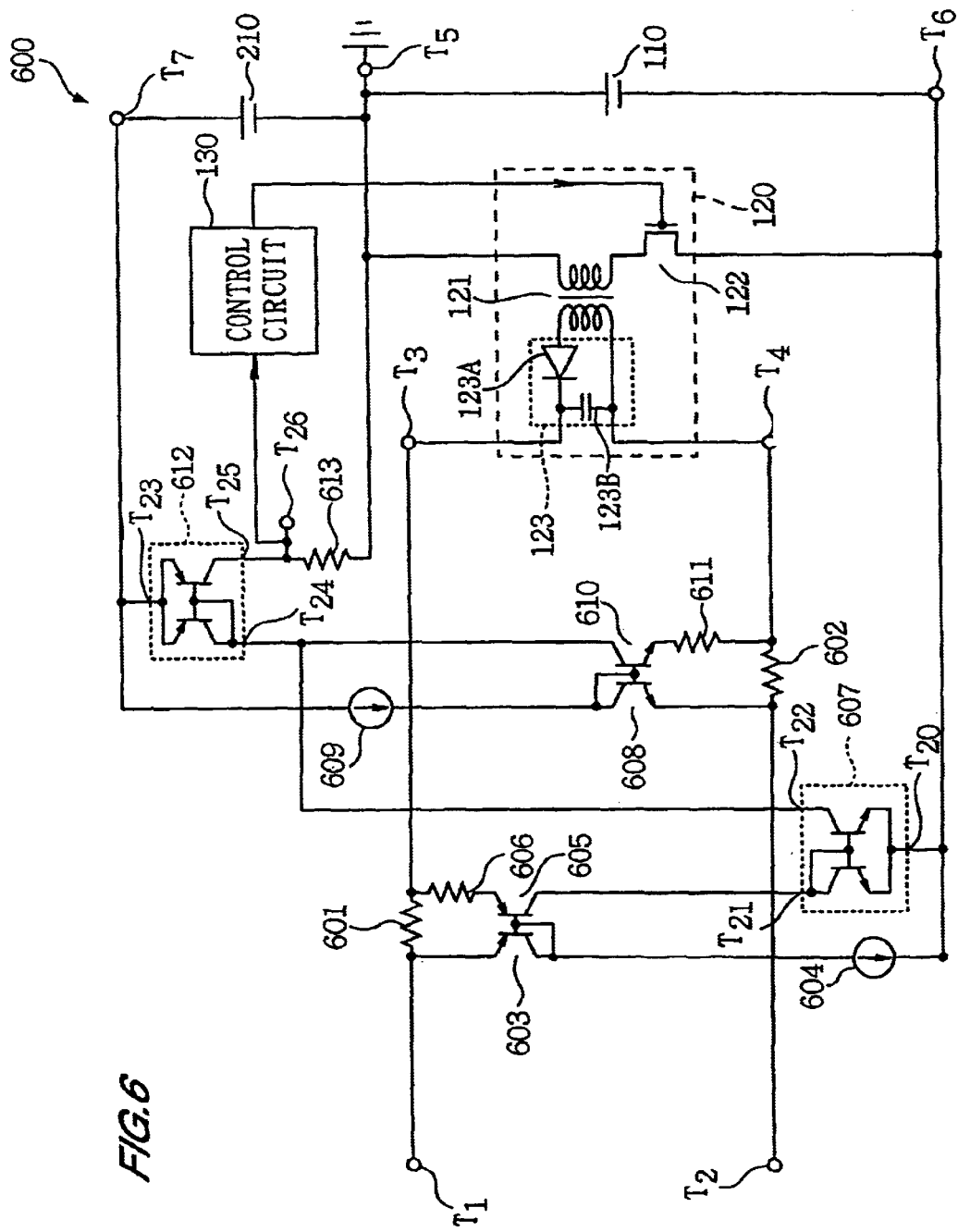
FIG. 6 is a circuitry diagram illustrating a sixth embodiment of the feeder circuit to which the present invention pertains.

We detail the sixth embodiment of present invention with reference to the FIG. 6.

Those constituent elements of the feeder circuit 600 illustrated in FIG. 6 which are the same as those illustrated in either of FIGS. 1 and 2 have been allocated the same codes.

A resistor 601 is connected between terminals $T_1$, $T_3$, and a resistor 602 between terminals $T_2$, $T_4$.

The emitter of a pnp-type bipolar transistor 603 is connected to terminal $T_1$, while the collector and base are connected by way of the direct-current power source 604 to terminal $T_6$. The base of a pnp-type bipolar transistor 605 is connected to the collector and base of the transistor 603, while the emitter is connected by way of a resistor 606 to terminal $T_3$, and the collector to terminal $T_{21}$ of a current mirror circuit 607.

The emitter of an npn-type bipolar transistor 608 is connected to terminal $T_2$, while the collector and base are connected by way of the direct-current power source 609 to terminal $T_7$. The base of an npn-type bipolar transistor 610 is connected to the collector and base of the transistor 608, while the emitter is connected by way of a resistor 611 to terminal $T_4$, and the collector to terminal $T_{24}$ of a current mirror circuit 612. The transistors 608, 610 have an ample current amplification factor, so that the collector current and emitter current can be regarded as being essentially the same. The potential difference between base and emitter in the transistor 608 and that between base and emitter in the transistor 610 are equal.

The current mirror circuit 607 is provided with two pnp-type bipolar transistors. The base and collector of one of these transistors are connected by terminal $T_{21}$ to the collector of the transistor 605, while the emitter is connected by terminal $T_{20}$ to terminal $T_6$. The collector of the other transistor is connected by terminal $T_{22}$ to terminal $T_{24}$ of the current mirror circuit 612, while the base is connected to terminal $T_{21}$.

The current mirror circuit 612 is provided with two npn-type bipolar transistors. The base and collector of one of these transistors are connected to terminal $T_{24}$, while the emitter is connected by terminal $T_{23}$ to terminal $T_7$. The base of the other transistor is connected to terminal $T_{24}$, while the collector is connected to terminal $T_{23}$, and also by terminal $T_{25}$ to terminal $T_5$ by way of the resistor 613. The potential of terminal $T_{25}$ is input to the control circuit 130. In addition, terminal $T_{25}$ is connected to signal detection terminal $T_{26}$.

The value of output current from the direct-current power sources 604, 609 is the same.

There follows a description of the principle behind the action of the feeder circuit 600.

A direct-current power supply output to terminals $T_3$, $T_4$ by the control circuit 130 and the regulator 120 is fed by way of terminals $T_1$, $T_2$ to the subscriber line.

A current $I_L$ fed by the switching regulator 120 flows through the resistor 601, terminal $T_3$, terminal $T_1$, subscriber line, terminal $T_2$, resistance 602 and terminal $T_4$.

A current $I_S$ fed by the direct-current power sources 604, 609 flows along a path through terminal $T_7$, the transistor 608, resistor 602, terminal $T_4$, terminal $T_3$, resistor 601, transistor 603, power source 604 and terminal $T_6$.

The current $I_S$ is considerably smaller than the current $I_L$, and may be disregarded. Thus, if the resistance value of the resistor 602 is $R_{602}$, the fall in voltage due to the resistor 602 is $I_L \times R_{602}$. Since the potential differences between base and emitter in the transistors 608, 610 are equal, the potential difference at both ends of the resistor 611 tallies with the level of the fall in voltage of the resistor 602. Hence, if the level of resistance of the resistor 611 is $R_{611}$, it follows that the value of the current a t the resistor element 611 is $I_L \times R_{602}/R_{611}$.

If the resistance levels $R_{601}$, $R_{602}$, $R_{606}$, $R_{611}$ of the resistors 601, 602, 606, 611 satisfy the condition $R_{601}/R_{606}=R_{602}/R_{611}$, the current levels at the resistors 606, 611 are equal. Hence, a current path is formed which comprises terminal $T_7$, terminal $T_{23}$ of the current mirror circuit 612, terminal $T_{24}$ transistor 608, resistor 611, terminal $T_4$ terminal $T_3$, resistor 606, transistor 605, terminal $T_{21}$ of the current mirror circuit 607, terminal $T_{20}$ and terminal $T_6$.

Since terminal $T_{22}$ of the current mirror circuit 607 is connected to terminal $T_{24}$ of the current mirror circuit 612, the value of the current at terminal $T_{24}$ is the sum of the currents flowing to the resistances 606, 611. The current output from terminal $T_{24}$ passes through terminal $T_7$, terminals $T_{23}$, $T_{25}$ of the current mirror circuit 112, and the resistor 613 to be input to terminal $T_5$.

Consequently, the potential $V_{26}$ at terminal $T_{26}$ fulfils the condition of the following formula, where the current $I_L$ can be calculated from the potential $V_{26}$ at terminal $T_{26}$ because the resistance levels $R_{601}$, $R_{602}$, $R_{606}$, $R_{611}$ of the resistors 601, 602, 606, 611 and the potential $V_5$ at terminal $T_5$ are known entities.

$$V_{26} = \left( I_L \frac{R_{611}}{R_{602}} + I_L \frac{R_{601}}{R_{606}} \right) \times R_{613} + V_5 \tag{11}$$

The potential $V_{26}$ at terminal $T_{26}$ is input to the control circuit 130, which controls negative feedback of electric power output from the regulator 120. Controlling negative feedback in this manner makes it possible to ensure that a constant current is fed despite fluctuations in the resistance level of the subscriber line.

Common-mode alternating-current induced voltage impressed externally on terminals $T_1$, $T_2$ is permissible provided that the bipolar transistors 603, 605, 608, 610 and the current mirror circuits 607, 611 are able to function. That is to say, the permissible range is one which fulfils the conditions $V_1 > V_6$ and $V_2 < V_7$. Hence, the maximum permissible common-mode alternating-current induced voltage is expressed by the above formula (10).

For example, if $V_7=5[V]$, $V_6=-48[V]$, $V_1-V_2=20[V]$, the maximum permissible level of common-mode alternating-current induced voltage is 36.5 [V]. In other words, the feeder circuit 600 permits a high level of common-mode alternating-current induced voltage.

In the present embodiment, the potential difference between terminals $T_{20}$, $T_{21}$ of the current mirror circuit 607 and that between terminals $T_{23}$, $T_{24}$ of the current mirror circuit 612 have been disregarded. Modifying formula (11) to take these potential differences into consideration will allow transistors to be employed in which it is not possible to disregard the potential differences. It should be noted, however, that the maximum permissible common-mode alternating-current induced voltage will decrease by the combined total of these potential differences.

Seventh Embodiment

Figure 7:
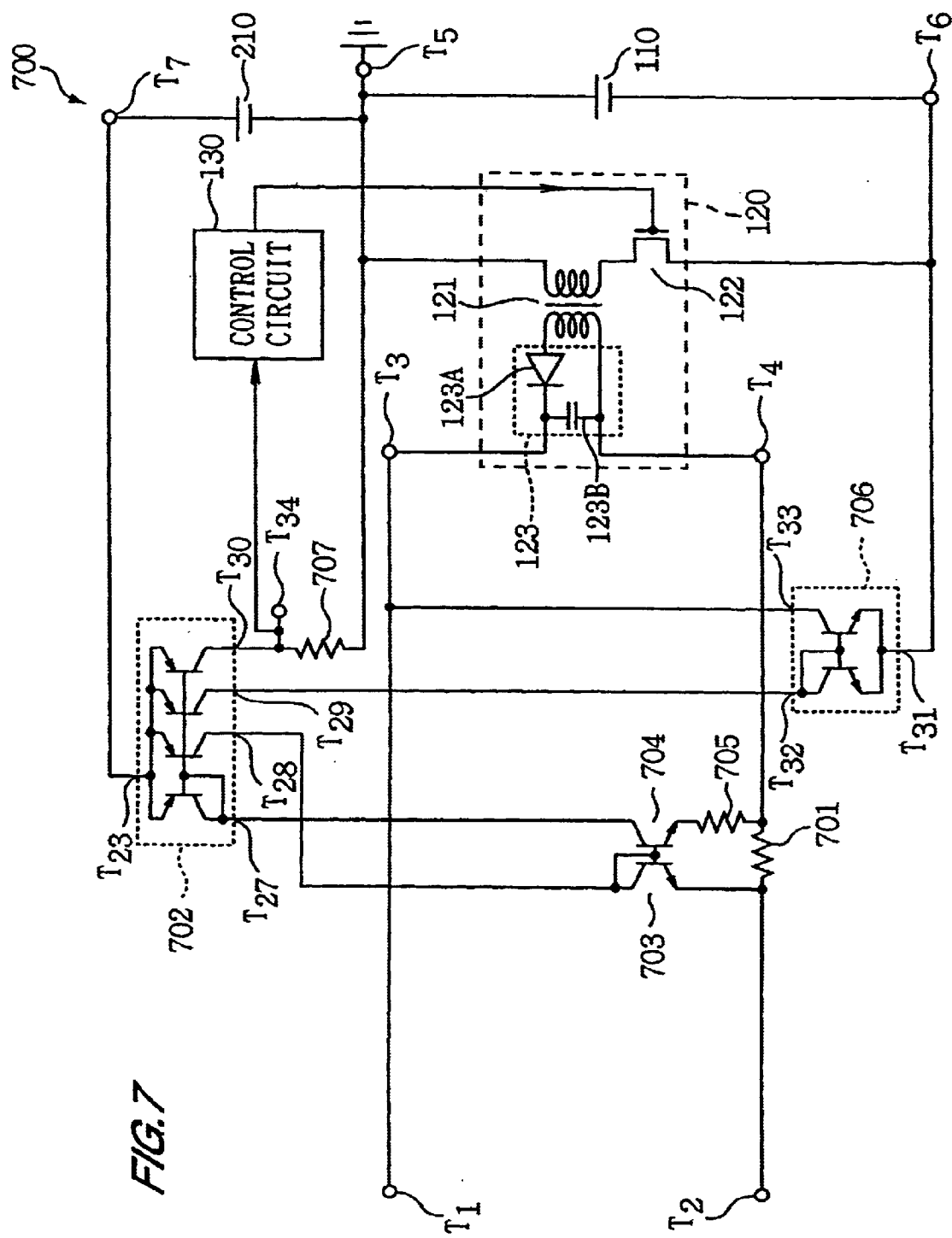
FIG. 7 is a circuitry diagram illustrating a seventh embodiment of the feeder circuit to which the present invention pertains.

We detail the seventh embodiment of present invention with reference to the FIG. 7.

Those constituent elements of the feeder circuit 700 illustrated in FIG. 7 which are the same as those illustrated in either of FIGS. 1 and 2 have been allocated the same codes.

In the feeder circuit 700, a resistor 701 is connected between terminals $T_2$, $T_4$.

The current mirror circuit 702 is provided with four npn-type bipolar transistors. The emitter of the first transistor is connected to terminal $T_{26}$, while the base and collector are connected to terminal $T_{27}$. The emitter of the second transistor is connected to terminal $T_{26}$, the base to terminal $T_{27}$, and the collector to terminal $T_{28}$. The emitter of the third transistor is connected to terminal $T_{26}$, the base to terminal $T_{27}$, and the collector to terminal $T_{29}$. The emitter of the fourth transistor is connected to terminal $T_{26}$, the base to terminal $T_{27}$, and the collector to terminal $T_{30}$. Terminal $T_{30}$ is connected by way of a resistor to terminal $T_5$. In addition, terminal $T_{30}$ is connected to signal detection terminal $T_{34}$. The present embodiment employs as the first transistor one which makes it possible to disregard the potential difference between terminals $T_{26}$, $T_{27}$.

The emitter of the pnp-type bipolar transistor 703 is connected to terminal $T_2$, while the base and collector are connected to terminal $T_{28}$. The emitter of the pnp-type bipolar transistor 704 is connected by way of a resistor 705 to terminal $T_4$, while the base is connected to terminal $T_{28}$, and the collector to terminal $T_{27}$. The potential difference between base and emitter in the transistor 703 and that between base and emitter in the transistor 704 are equal.

The current mirror circuit 706 is provided with two pnp-type bipolar transistors. The emitter of one of these transistors is connected by way of terminal $T_{31}$ to terminal $T_6$, while the collector and base are connected by way of terminal $T_{32}$ to terminal $T_{29}$. The emitter of the other transistor is connected to terminal $T_{31}$, the base to terminal $T_{32}$, and the collector by way of terminal $T_{33}$ to terminal $T_3$.

There follows a description of the function of the feeder circuit 700.

A direct-current power supply output to terminals $T_3$, $T_4$ by the control circuit 130 and the regulator 120 is fed by way of terminals $T_1$, $T_2$ to the subscriber line.

An electric current $I_L$ fed by the regulator 120 flows through terminal $T_3$, terminal $T_1$, the subscriber line, terminal $T_2$, resistance 701 and terminal $T_4$.

Consequently, if the resistance value of the resistor 701 is $R_{701}$, the fall in voltage due to the resistor 701 is $I_L \times R_{701}$. Since the potential differences between base and emitter in the transistors 703, 704 are equal, the potential difference at both ends of the resistor 705 tallies with the level of the fall in voltage of the resistor 701. Hence, if the level of resistance of the resistor 705 is $R_{705}$, the value of the current at the resistor element 705 is $I_L \times R_{701}/R_{705}$. This current flows along a path formed by terminal $T_7$, terminal $T_{26}$ of the current mirror circuit 702, terminal $T_{27}$, transistor 704, resistor 705, terminal $T_4$, terminal $T_3$, terminal $T_{33}$ of the current mirror circuit 706, terminal $T_{31}$ and terminal $T_6$. In addition, a current of the same value as the current $I_L$ flows along a path formed by terminal $T_7$, terminal $T_{26}$ of the current mirror circuit 702, terminal $T_{28}$, transistor 703, resistor 701, terminal $T_4$, terminal $T_3$, terminal $T_{32}$ of the current mirror circuit 708, terminal $T_{31}$ and terminal $T_6$. The currents flowing along these two paths serve to ensure that the potential difference between base and emitter in the transistor 703 and that between base and emitter in the transistor 704 are totally equal. In addition, they make it possible to prevent the occurrence of a current imbalance in the loop. The fall in voltage due to the current in the resistor 701 is much smaller than the detection current, and can be disregarded.

The same value of current flows to the resistor 707 as to the resistor 705. Consequently, if the resistance level of the resistor 707 is $R_{707}$, the potential detected at terminal $T_{34}$ can be expressed by the following formula.

$$V(T301)=I_L * R301/R302 * R303 +V(V1) \qquad \text{Formula 12}$$

Here, $R_{701}$, $R_{705}$, $R_{707}$ and $V_5$ are known entities, so that the current $I_L$ can be calculated from the potential $V_{34}$ at terminal $T_{34}$.

The potential $V_{34}$ at terminal $T_{34}$ is input to the control circuit 130, and is used to control negative feedback from the regulator 120. Controlling negative feedback in this manner makes it possible to ensure that a constant current is fed despite fluctuations in the resistance level of the subscriber line.

Common-mode alternating-current induced voltage impressed externally on terminals $T_1$, $T_2$ is permissible provided that the bipolar transistors 703, 704 and the current mirror circuits 702, 706 are able to function. That is to say, the permissible range is one which fulfils the conditions $V_1 > V_6$ and $V_2 < V_7$. Hence, the maximum permissible common-mode alternating-current induced voltage is expressed by the above formula (10).

For example, if $V_7 = 5[V]$, $V_6 = -48[V]$, $V_1 - V_2 = 20[V]$, the maximum permissible level of common-mode alternating-current induced voltage is 36.5 [V]. In other words, the feeder circuit 700 permits a high level of common-mode alternating-current induced voltage.

In the present embodiment, the potential difference between terminals $T_{26}$, $T_{27}$ of the current mirror circuit 702 and that between terminals $T_{31}$, $T_{32}$ of the current mirror circuit 706 have been disregarded. Modifying formula (11) to take these potential differences into consideration will allow transistors to be employed in which it is not possible to disregard the potential differences. It should be noted, however, that the maximum permissible common-mode alternating-current induced voltage will decrease by the combined total of these potential differences.

Eighth Embodiment

Figure 8:
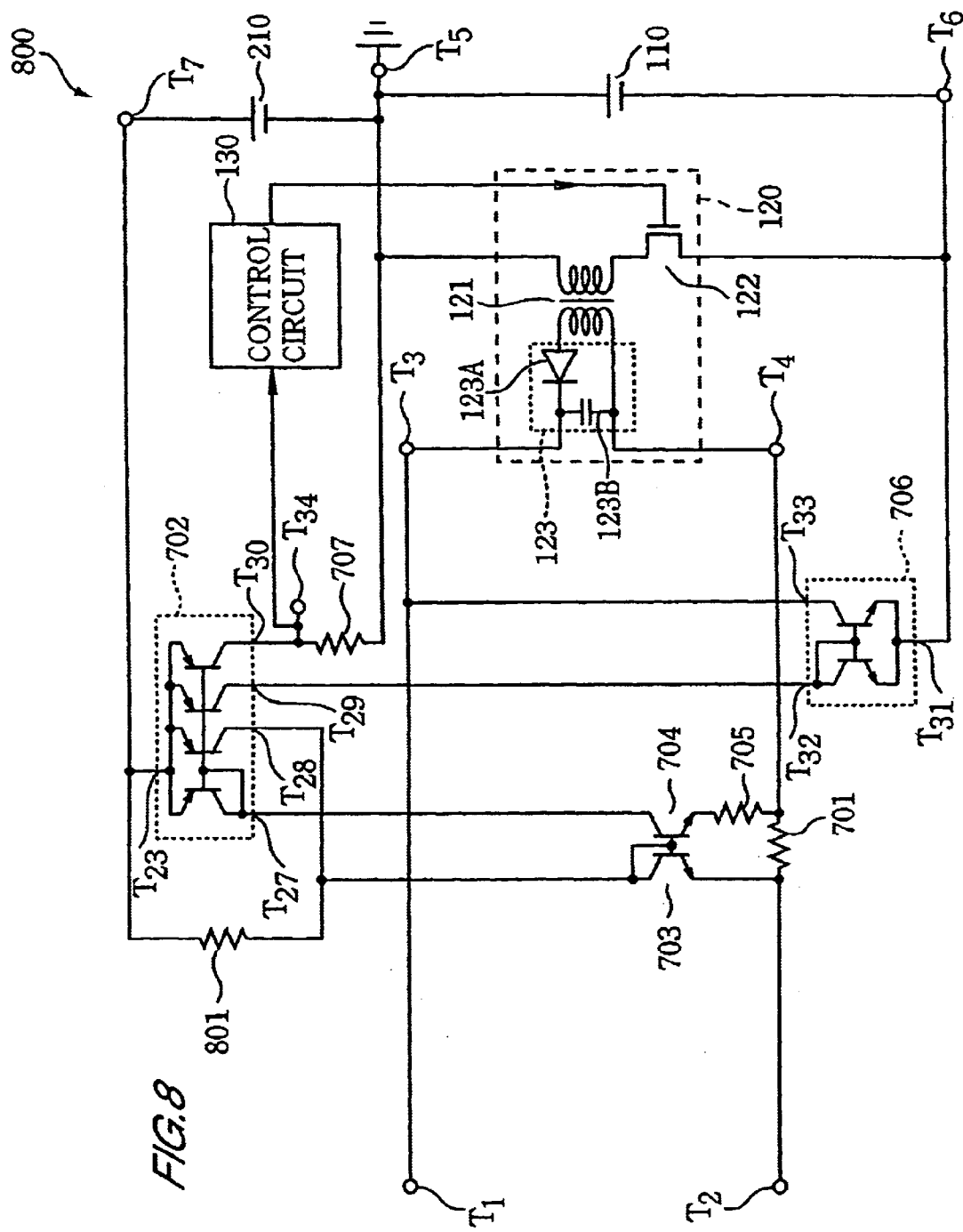
FIG. 8 is a circuitry diagram illustrating a eighth embodiment of the feeder circuit to which the present invention pertains.

We detail the eighth embodiment of present invention with reference to the FIG. 8.

Those constituent elements of the feeder circuit 800 illustrated in FIG. 8 which are the same as those illustrated in any of FIGS. 1, 2 and 7 have been allocated the same codes.

The present embodiment differs from the feeder circuit 700 of the seventh embodiment in that it is provided with a resistor 801, one terminal of which is connected to terminal $T_{26}$, the other to terminal $T_{28}$.

In the feeder circuit 800, electric current output from terminal $T_7$ passes through the resistor 801 to be input to the collector of the transistor 703. The value of this current is normally in the range of a few microamperes or less. This current ensures that the transistor 703 is never completely off even when there is no current flowing to the subscriber line connected to terminals $T_1$, $T_2$. In addition, it facilitates rapid current detection when this suddenly flows to the subscriber line.

Ninth Embodiment

Figure 9:
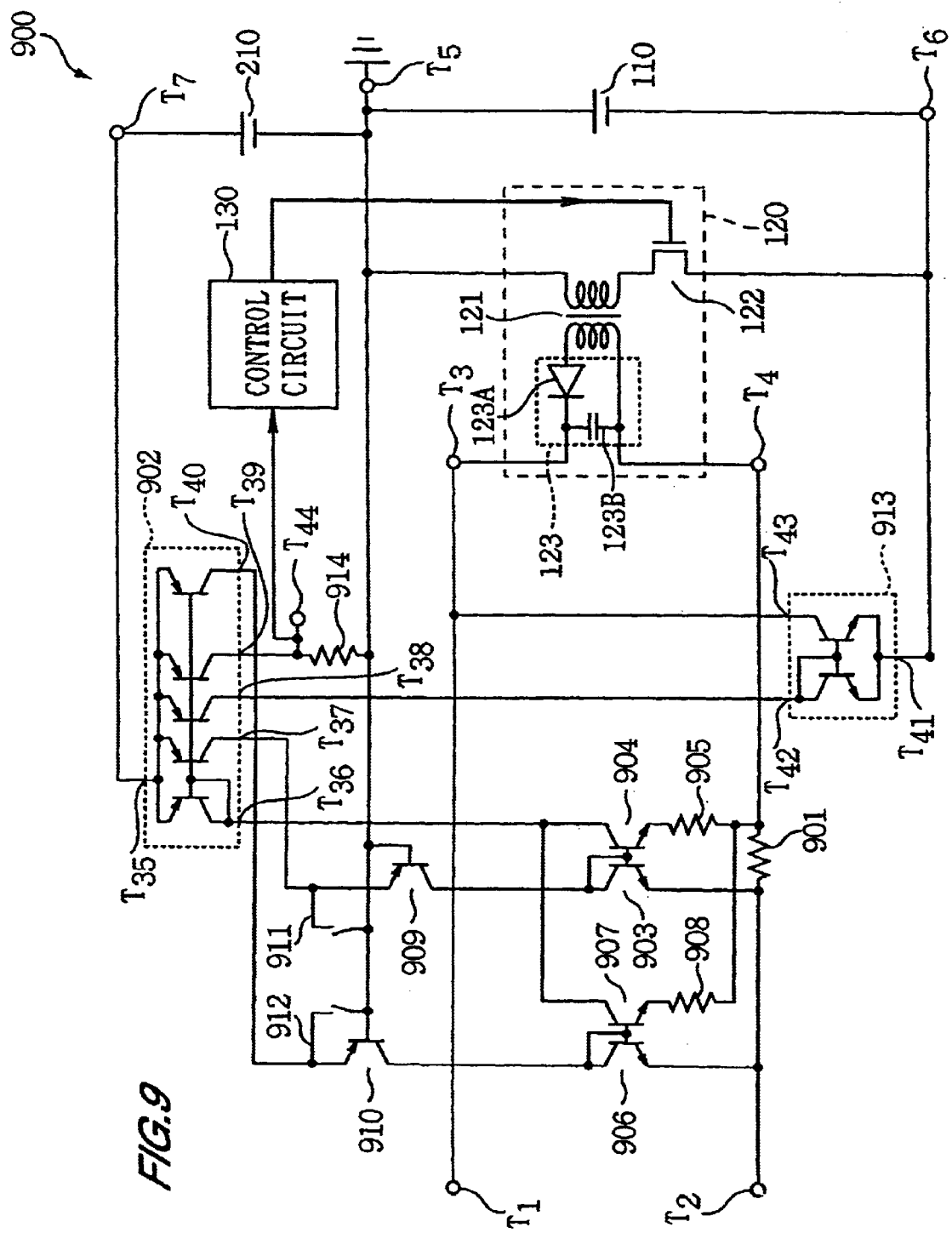
FIG. 9 is a circuitry diagram illustrating a ninth embodiment of the feeder circuit to which the present invention pertains.

We detail the ninth embodiment of present invention with reference to the FIG. 9.

Those constituent elements of the feeder circuit 900 illustrated in FIG. 9 which are the same as those illustrated in either of FIGS. 1 and 2 have been allocated the same codes.

In the feeder circuit 900, a resistor 901 is connected between terminals $T_2$, $T_4$.

The current mirror circuit 902 is provided with five pnp-type bipolar transistors. The emitter of the first transistor is connected to terminal $T_{35}$, while the collector and base are connected to terminal $T_{36}$. The emitter of the second transistor is connected to terminal $T_{35}$, the base to terminal $T_{36}$, and the collector to terminal $T_{37}$. The emitter of the third transistor is connected to terminal $T_{35}$, the base to terminal $T_{36}$, and the collector to terminal $T_{38}$. The emitter of the fourth transistor is connected to terminal $T_{35}$, the base to terminal $T_{36}$, and the collector to terminal $T_{39}$. The emitter of the fifth transistor is connected to terminal $T_{35}$, the base to terminal $T_{36}$, and the collector to terminal $T_{40}$. Terminal $T_{35}$ is connected to terminal $T_7$, while terminal $T_{39}$ is connected by way of a resistor 914 to terminal $T_5$.

The emitter of the transistor 903 is connected to terminal $T_1$, while the collector and base are connected to the collector of a transistor 909. The emitter of the transistor 904 is connected by way of a resistor 905 to terminal $T_4$, while the base is connected to the collector of a transistor 909, and the collector to terminal $T_{36}$.

The emitter of the transistor 906 is connected to terminal $T_2$, while the collector and base are connected to the collector of a transistor 910. The emitter of the transistor 907 is connected by way of a resistor 908 to terminal $T_4$, while the base is connected to the collector of the transistor 910, and the collector to terminal $T_{36}$. The transistors 906, 907 have an ample current amplification factor, so that the collector current and emitter current can be regarded as being essentially the same. The potential differences between base and emitter in the bipolar transistors 906, 907 are equal.

The emitter of the transistor 909 is connected to terminal $T_{37}$, while the base is connected to terminal $T_5$. The emitter and base of the transistor 909 are connected by way of a switch 911. The emitter of the transistor 910 is connected to terminal $T_{39}$, while the base is connected to terminal $T_5$. The emitter and base of the transistor 910 are connected by way of a switch 912. The transistors 909, 910 have an ample current amplification factor, so that the collector current and emitter current can be regarded as being essentially the same. The potential differences between base and emitter in the bipolar transistors 909, 910 are equal.

The current mirror circuit 913 is provided with two npn-type bipolar transistors. The emitter of one of these transistors is connected to terminal $T_{41}$, while the collector and base are connected to terminal $T_{38}$. The emitter of the other transistor is connected to terminal $T_{41}$, the base to terminal $T_{38}$, and the collector to terminal $T_{43}$. Terminal $T_{41}$ is connected to terminal $T_2$, terminal $T_{42}$ to terminal $T_{38}$, and terminal $T_{43}$ to terminal $T_3$.

There follows a description of the function of the feeder circuit 900.

A direct-current power supply output to terminals $T_3$, $T_4$ by the control circuit 130 and the regulator 120 is fed by way of terminals $T_1$, $T_2$ to the subscriber line. As a result, an electric current $I_L$ flows along a path comprising terminal $T_3$, terminal $T_1$, the subscriber line, terminal $T_2$, resistance 901 and terminal $T_4$. If the resistance value of the resistor 901 is $R_{901}$, the fall in voltage due to the resistor 901 is $I_L \times R_{901}$.

If the switch 911 is closed and the switch 912 is open, the base and emitter of the transistor 909 are short-circuited, but not the base and emitter of the transistor 910. Thus, the transistor 909 is turned off, and the transistor 910 on. Since the transistor 909 is off, the transistors 903, 904 are also off. Meanwhile, since the transistor 910 is on, the transistors 906, 907 are also on. The potential differences between base and emitter of the transistors 906, 907 are equal, with the result that the potential difference between the two ends of the resistance 908 stabilises in a state where it tallies with the abovementioned fall in voltage $I_L \times R_{901}$.

Consequently, if the levels of resistance of the resistors 901, 908 are $R_{901}$, $R_{908}$, the value of the current at the resistor element 908 is $I_L \times R_{901}/R_{908}$. This current flows along a path comprising terminal $T_7$, terminal $T_{35}$, terminal $T_{36}$ of the current mirror circuit 902, transistor 907, resistor 908, terminal $T_4$, terminal $T_3$, terminal $T_{43}$ of the current mirror circuit 913, terminal $T_4$, and terminal $T_6$.

The value of current at the resistor 303 tallies with that at the resistor 908. Consequently, the potential $V_{44}$ at terminal $T_{44}$ can be expressed by the following formula.

$$V_{44} = I_L \times \frac{R_{901}}{R_{905}} \times R_{914} + V_5 \qquad (13)$$

If the switch 911 is open and the switch 912 is closed, the transistor 909 is turned on, and the transistor 910 off. Hence, the transistors 903, 904 are also on, and the transistors 906, 907 off. The potential differences between base and emitter of the transistors 903, 904 are equal, with the result that if the resistance level of the resistor 905 is $R_{905}$, the current flowing to the resistor 905 is $I_L \times R_{901}/R_{905}$. This current flows along a path comprising terminal $T_7$, terminal $T_{35}$ of the current mirror circuit 902, terminal $T_{36}$, transistor 904, resistor 905, terminal $T_4$, terminal $T_3$, terminal $T_{43}$ of the current mirror circuit 913, terminal $T_{41}$ and terminal $T_6$.

The value of current at the resistor 303 tallies with that at the resistor 905. Consequently, the potential $V_{44}$ at terminal $T_{44}$ can be expressed by formula (12).

Suppose, for example, that $R_{901}=10[\Omega]$, $R_{905}=10[k\Omega]$, $R_{914}=10[k\Omega]$, $R_{908}=100[k\Omega]$. If the switch 911 is closed and the switch 912 open, $V_{44}=I_L \times 1000 + V_5$. On the other hand, if the switch 911 is open and the switch 912 closed, $V_{44}=I_L \times 10 + V_5$. That is to say, the feeder circuit 900 allows the range of current output by terminal $T_{44}$ to be switched with the aid of the switches 911, 912.

Tenth Embodiment

Figure 10:
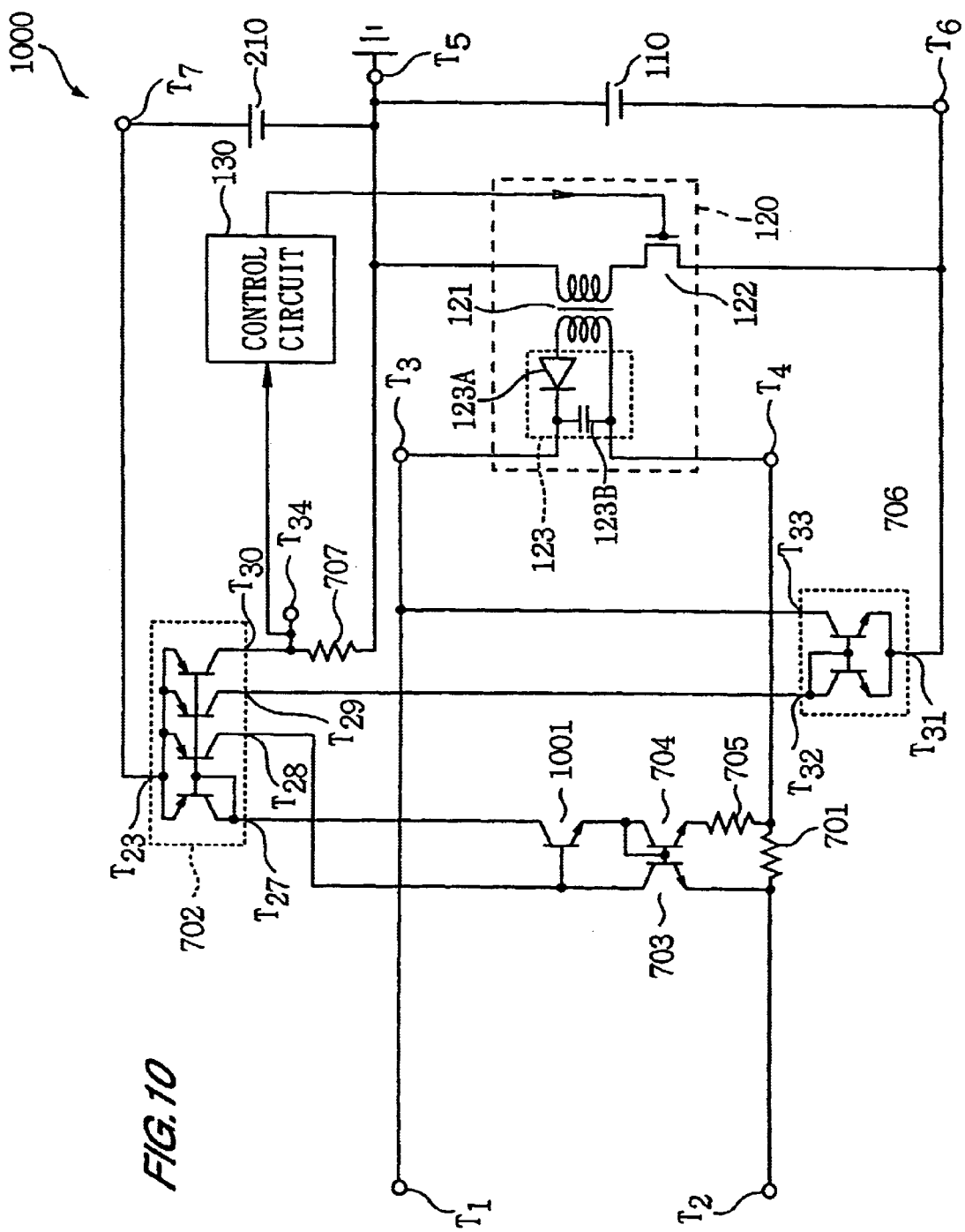
FIG. 10 is a circuitry diagram illustrating a tenth embodiment of the feeder circuit to which the present invention pertains.

We detail the tenth embodiment of present invention with reference to the FIG. 10.

Those constituent elements of the feeder circuit 1000 illustrated in FIG. 10 which are the same as those illustrated in any of FIGS. 1, 2 and 7 have been allocated the same codes.

The feeder circuit 1000 of the present embodiment differs from the feeder circuit 700 illustrated in FIG. 7 in that it is provided with an npn-type bipolar transistor 1001, the collector of which is connected to terminal $T_{27}$, the emitter to the collector of the transistor 704, and the base to terminal $T_{28}$.

What is more, the feeder circuit 1000 differs from the feeder circuit 700 in that the bases of the transistors 703, 704 are connected to the emitter of a transistor 1001.

Provision of the transistor 1001 in the feeder circuit 1000 means that the output impedance at terminals $T_{27}$, $T_{28}$ in relation to the transistors 703, 704 is higher than in the case of the feeder circuit 700. If terminals $T_{27}$, $T_{28}$ are paired input terminals and the collectors of the transistors 703, 704 are output terminals, the transistor 1001 forms a base earth circuit.

Consequently, there is little fluctuation in the collector current of the transistor 1000 even if the impression of a high common-mode alternating-current induced voltage on terminals $T_1$, $T_2$ causes the emitter current of the transistor 1000 to fluctuate considerably. This in turn means that there is little current fluctuation in the bipolar transistors 701, 702.

Eleventh Embodiment

Figure 11:
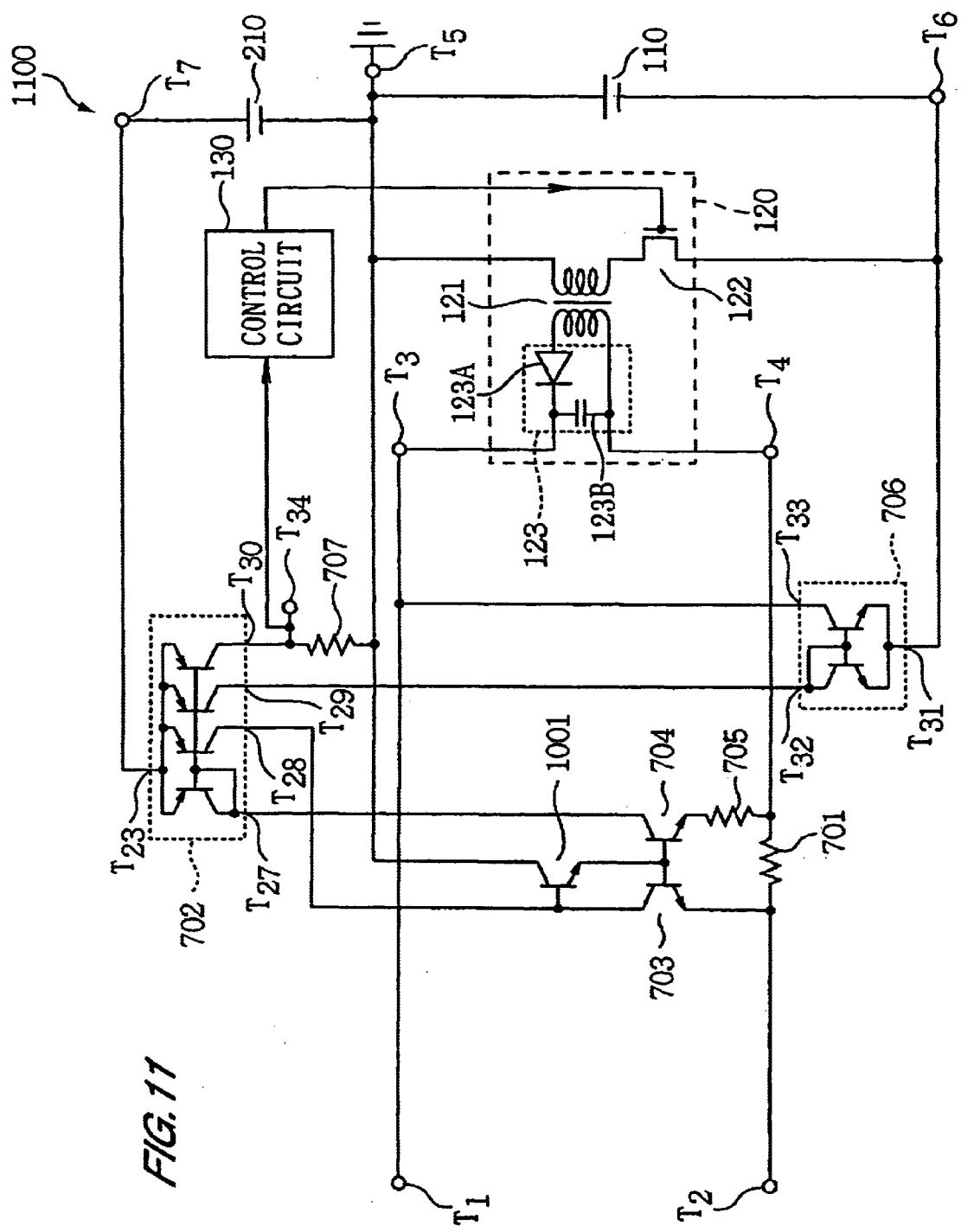
FIG. 11 is a circuitry diagram illustrating a eleventh embodiment of the feeder circuit to which the present invention pertains.

We detail the eleventh embodiment of present invention with reference to the FIG. 11.

Those constituent elements of the feeder circuit 1100 illustrated in FIG. 11 which are the same as those illustrated in any of FIGS. 1, 2 and 7 have been allocated the same codes.

The feeder circuit 1100 of the present embodiment differs from the feeder circuit 700 illustrated in FIG. 7 in that it is provided with an npn-type bipolar transistor 1101, the collector of which is connected to terminal $T_5$, the emitter to the bases of the transistors 703, 704, and the base to terminal $T_{28}$.

In the present embodiment, the base current of the transistors 703, 704 is fed from terminal $T_5$. As a result, there is little fluctuation in the current fed to the transistors 703, 704, with consequent increased accuracy of signal detection from terminal $T_{34}$.

Twelfth Embodiment

Figure 12:
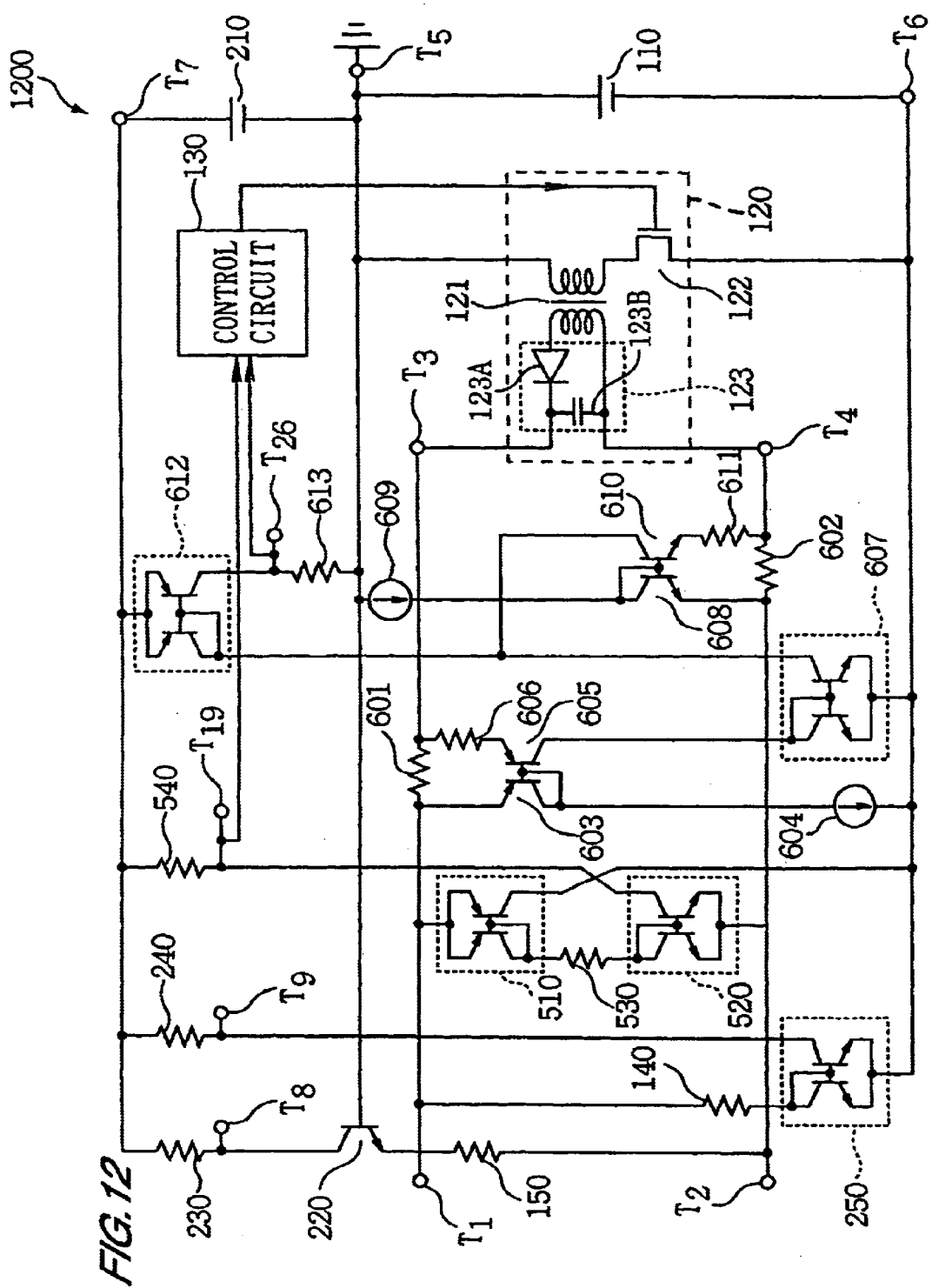
FIG. 12 is a circuitry diagram illustrating a twelfth embodiment of the feeder circuit to which the present invention pertains.

We detail the twelfth embodiment of present invention with reference to the FIG. 12.

Those constituent elements of the feeder circuit 1200 illustrated in FIG. 12 which are the same as those illustrated in any of FIGS. 1, 2, 5 and 6 have been allocated the same codes.

The feeder circuit 1200 of the present embodiment is constituted by combining the second, fifth and sixth embodiments.

With the feeder circuit 1200 it is possible to utilise the resistors 140, 150, 230, 240, the transistor 220 and the current mirror circuit 250 in order to stabilise the median value of the potential of the subscriber line in the vicinity of the median value of the potentials at the power source terminals $T_5$, $T_6$, thus making it possible to absorb any imbalance in the current from the subscriber line and detect potential differences between terminals $T_1$, $T_2$ on the one hand and $T_5$, $T_6$ on the other.

In the feeder circuit 1200, the current mirror circuits 510, 520 and the resistors 530, 540 allow the potential difference between terminals $T_1$, $T_2$ to be detected, and the results fed to the control circuit 130.

Furthermore, the resistors 602, 611, 613, the transistors 603, 605, 608, 610, the current mirror circuits 607, 621 and the power sources 604, 609 in the feeder circuit 1200 allow the current flowing to terminals $T_1$, $T_2$ to be detected, and the results fed to the control circuit 130.

The detected results can each be used to monitor the state of external circuits connected to terminals $T_1$, $T_2$. For instance, if terminals $T_1$, $T_2$ are connected by way of the subscriber line to the subscriber circuit, it is possible to detect calls from the subscriber terminal by virtue of the fact that the current detection level has exceeded a set value. In addition, it is possible on the basis of the current detection value to detect when the subscriber line has short-circuited and assumed earth potential.

The control circuit 130 allows the voltage detection level or current detection level to be utilised in order to set constant current, low voltage, current restriction, voltage restriction, constant resistance and other characteristics.

The circuit for implementing these settings may comprise an operational amplifier, current mirror circuit and other entities provided within the control circuit 130. Alternatively, it may comprise a circuit for converting the voltage or current detection levels into digital signals, a microprocessor, and a circuit for converting the digital signals output by the microprocessor into analogue signals.

As explained above, the feeder circuit 1200 has similar effects to the feeder circuits of the first, second, fifth and sixth embodiments.

Thirteenth Embodiment

Figure 13:
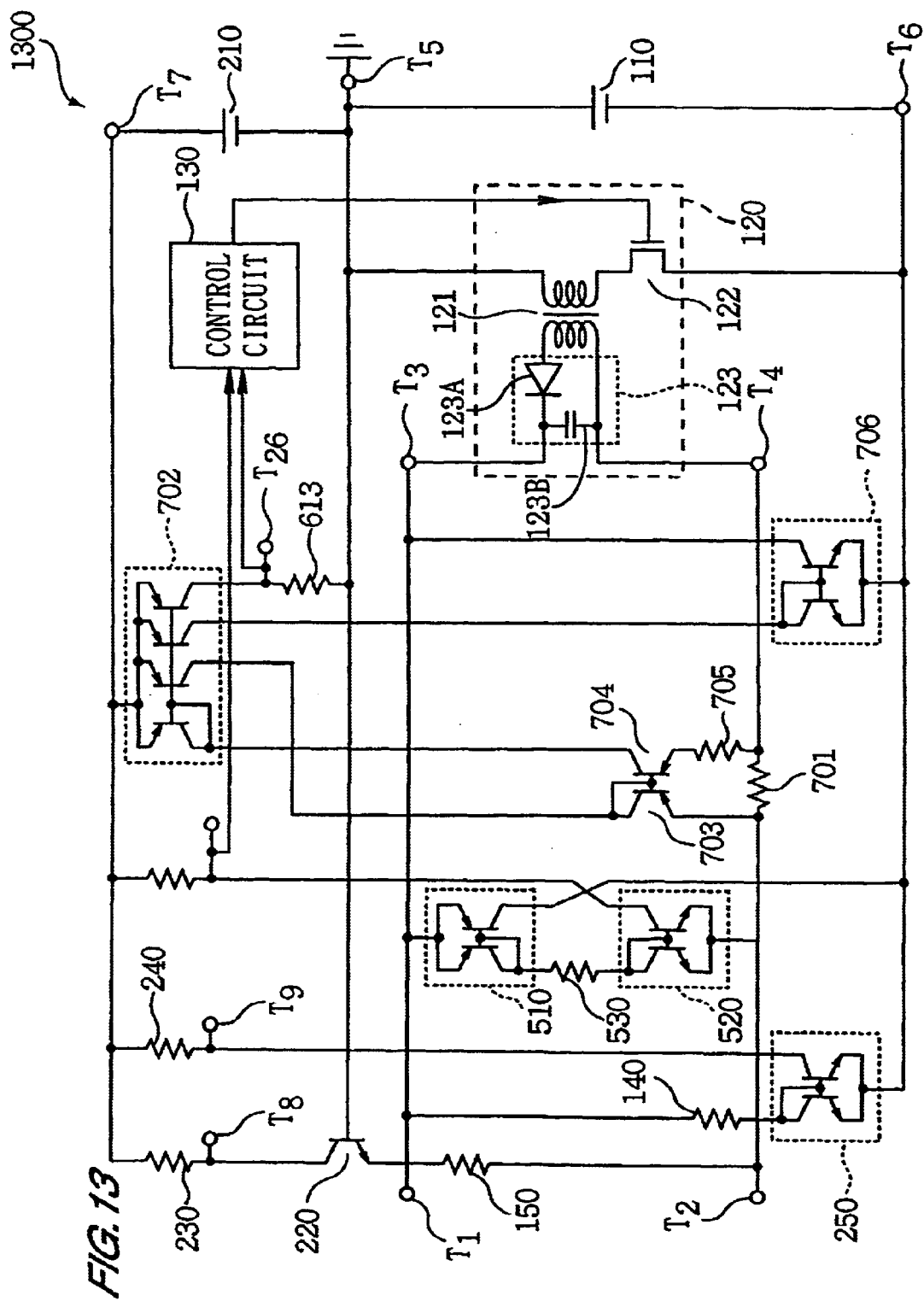
FIG. 13 is a circuitry diagram illustrating a thirteenth embodiment of the feeder circuit to which the present invention pertains.

We detail the thirteenth embodiment of present invention with reference to the FIG. 13.

Those constituent elements of the feeder circuit 1300 illustrated in FIG. 13 which are the same as those illustrated in any of FIGS. 2, 5 and 7 have been allocated the same codes.

The feeder circuit 1300 of the present embodiment is constituted by combining the second, fifth and seventh embodiments.

Polar transistors Q301, Q302 and current mirror circuits 607, 612 allow the feeder circuit 1300 to detect the current flowing to terminals $T_1$, $T_2$ and feed the results to the control circuit 130.

The feeder circuit 1300 has a similar effect to the feeder circuits of the second, fifth, seventh and twelfth embodiments.

Fourteenth Embodiment

Figure 14:
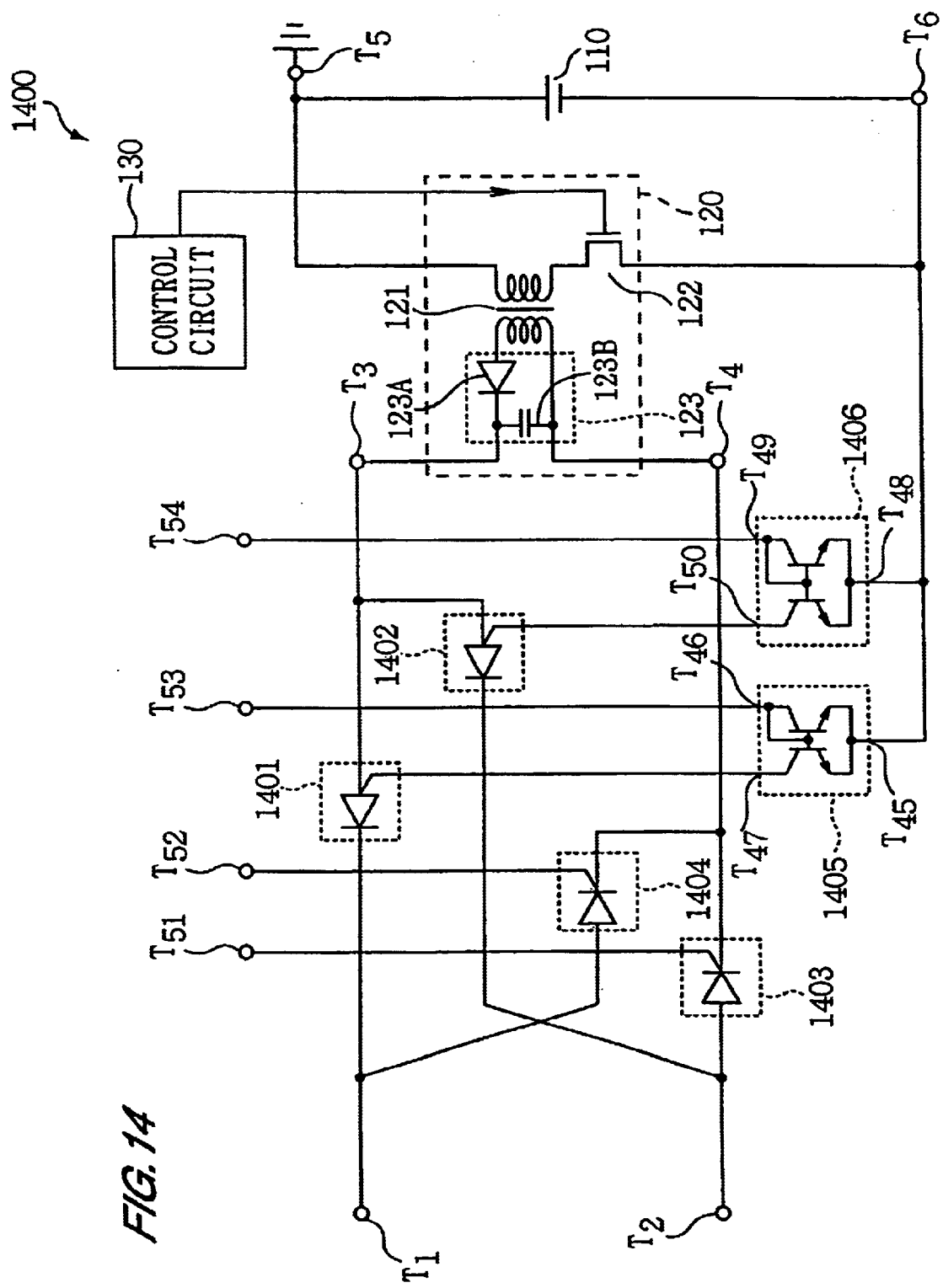
FIG. 14 is a circuitry diagram illustrating a fourteenth embodiment of the feeder circuit to which the present invention pertains.

We detail the fourteenth embodiment of present invention with reference to the FIG. 14.

Those constituent elements of the feeder circuit 1400 illustrated in FIG. 14 which are the same as those illustrated in FIG. 1 have been allocated the same codes.

In the feeder circuit 1400, the cathode of a thyristor 1401 is connected to terminal $T_1$, while the anode is connected to terminal $T_3$, and the gate to terminal $T_{47}$. Meanwhile, the cathode of a thyristor 1402 is connected to terminal $T_2$, while the anode is connected to terminal $T_3$, and the gate to terminal $T_{50}$. Similarly, the cathode of a thyristor 1403 is connected to terminal $T_4$, while the anode is connected to terminal $T_2$, and the gate to terminal $T_{51}$. Finally, the cathode of a thyristor 1404 is connected to terminal $T_4$, while the anode is connected to terminal $T_1$, and the gate to terminal $T_{52}$. The potential difference between cathode and anode in these thyristors can be disregarded.

The current mirror circuit 1405 is provided with two npn-type bipolar transistors. The emitter of one of these transistors is connected to terminal $T_{45}$, the base to terminal $T_{46}$, and the collector to terminal $T_{47}$. The emitter of the other transistor is connected to terminal $T_{45}$, while the base and collector are connected to terminal $T_{46}$. Terminal $T_{45}$ is connected to terminal $T_6$, and terminal $T_{46}$ to signal detection terminal $T_{53}$. The potential difference between terminals $T_{45}$, $T_{46}$ can be disregarded.

The current mirror circuit 1406 is provided with two npn-type bipolar transistors. The emitter of one of these transistors is connected to terminal $T_{48}$, the base to terminal $T_{49}$, and the collector to terminal $T_{50}$. The emitter of the other transistor is connected to terminal $T_{48}$, while the base and collector are connected to terminal $T_{49}$. Terminal $T_{48}$ is connected to terminal $T_6$, and terminal $T_{49}$ to signal output terminal $T_{54}$. The potential difference between terminals $T_{48}$, $T_{49}$ can be disregarded.

There follows a description of the function of the feeder circuit 1400.

The control circuit 130 and regulator 120 allow direct-current electric power output to terminals $T_3$, $T_4$ to be fed from terminals $T_1$, $T_2$ to the subscriber line.

If no current is fed from terminals $T_{51}$–$T_{54}$, there is no continuity between the thyristors 1401–1404, as a result of which terminals $T_1$, $T_2$ are disconnected from the regulator 120. Hence, no direct-current power is supplied to the subscriber line.

If a control current is fed from terminals $T_5$, $T_{53}$ and not from terminals $T_{52}$, $T_{54}$, there is continuity between the thyristors 1401, 1403, but not between the thyristors 1402, 1404. As a result, the electric current output by the regulator 120 flows in order from terminal $T_3$ through terminal $T_1$, the subscriber line and terminal $T_2$ to terminal $T_4$.

If a control current is fed from terminals $T_{52}$, $T_{54}$ and not from terminals $T_5$, $T_{53}$, there is continuity between the thyristors 1402, 1404, but not between the thyristors 1401, 1403. As a result, the electric current output by the regulator 120 flows in order from terminal $T_3$ through terminal $T_2$, the subscriber line and terminal $T_1$ to terminal $T_4$.

The current mirror circuits 1405, 1406 convert the unidirectional control signal current in accordance with the control signal current of the thyristors D1410, D1402.

In this manner, by virtue of a control current fed to terminals $T_{51}$–$T_{54}$ the feeder circuit 1400 allows terminals $T_1$, $T_2$ to be disconnected from and connected to the regulator 120, or polarity to be reversed.

If common-mode alternating-current induced voltage is impressed on terminals $T_1$, $T_2$, the feeder circuit 1400 functions normally insofar as it is possible to feed the control current to the thyristors 1401–1404, which is to say insofar as the current mirror circuits 1405, 1406 function. What is required for the current mirror circuits 1405, 1406 to function is that the potentials $V_1$, $V_2$ of terminals $T_1$, $T_2$ fulfil the inequality $V_1 > V_2$. Under normal design conditions, the feeder circuit 1400 is capable of functioning correctly even if a common-mode alternating-current induced voltage of a magnitude of several tens of volts is impressed on it.

In the present embodiment, the potential difference between terminals $T_{45}$, $T_{46}$ and that between terminals $T_{48}$, $T_{49}$ have been disregarded, but it is also possible to employ thyristors which the potential differences cannot be disregarded. It should be noted, however, that the maximum permissible common-mode alternating-current induced voltage will decrease by the combined total of these potential differences.

Fifteenth Embodiment

Figure 15:
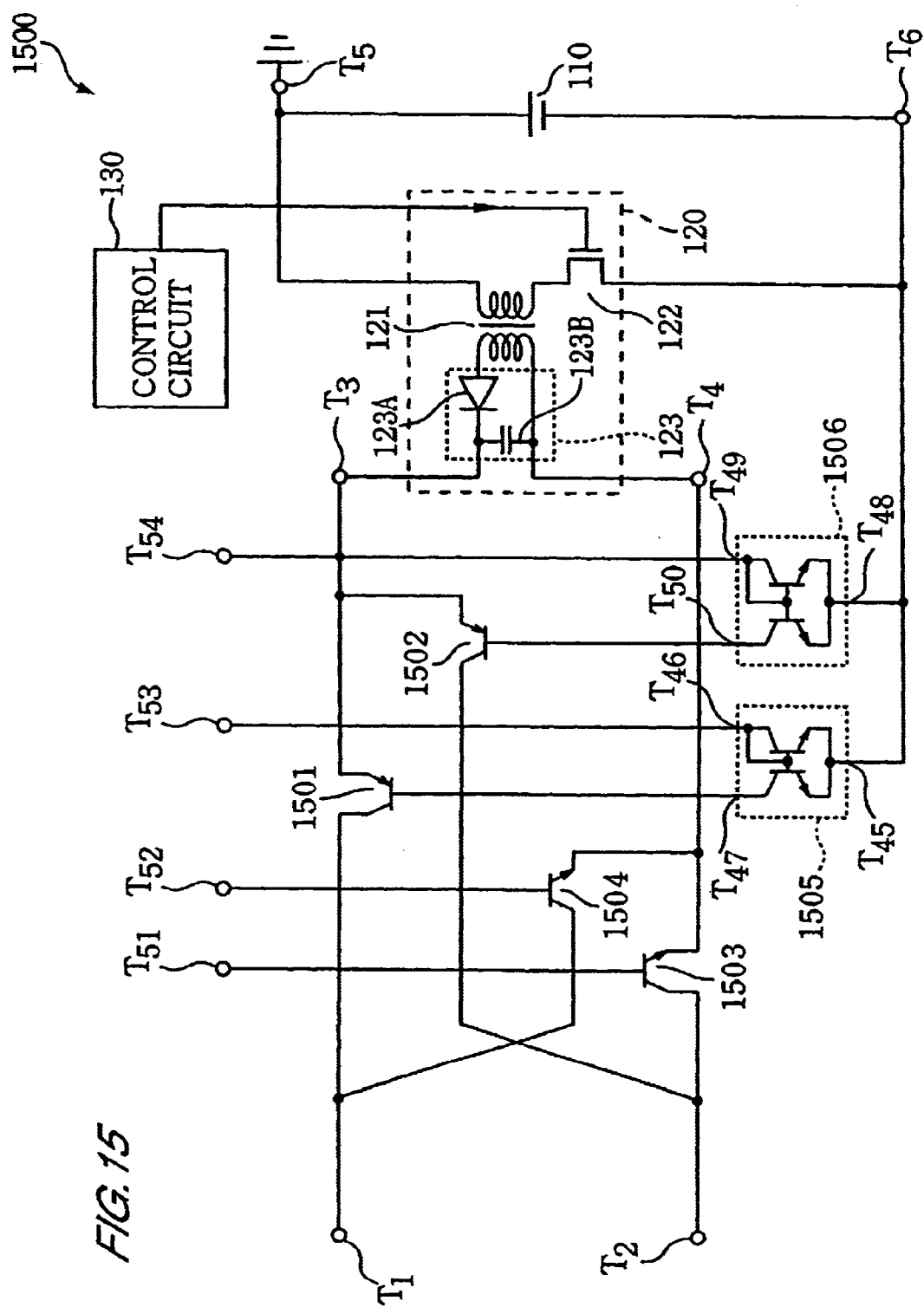
FIG. 15 is a circuitry diagram illustrating a fifteenth embodiment of the feeder circuit to which the present invention pertains.

We detail the fifteenth embodiment of present invention with reference to the FIG. 15.

Those constituent elements of the feeder circuit 1500 illustrated in FIG. 15 which are the same as those illustrated in FIG. 1 have been allocated the same codes.

In the feeder circuit 1500, the collector of a pnp-type bipolar transistor 1501 is connected to terminal $T_1$, while the emitter is connected to terminal $T_3$, and the base to terminal $T_{57}$. Similarly, the collector of a pnp-type bipolar transistor 1502 is connected to terminal $T_2$, the emitter to terminal $T_3$, and the base to terminal $T_{60}$. Meanwhile, the emitter of an npn-type bipolar transistor 1503 is connected to terminal $T_4$, the collector to terminal $T_2$, and the base to terminal $T_{61}$. In the same manner, the emitter of an npn-type bipolar transistor 1504 is connected to terminal $T_4$, the collector to terminal $T_1$, and the base to terminal $T_{62}$. In these transistors, the potential difference between collector and emitter can be disregarded.

The current mirror circuit 1505 is provided with two npn-type bipolar transistors. The emitter of one of these transistors is connected to terminal $T_{55}$, the base to terminal $T_{56}$, and the collector to terminal $T_{57}$. The emitter of the other transistor is connected to terminal $T_{55}$, while the base and collector are connected to terminal $T_{56}$. Terminal $T_{55}$ is connected to terminal $T_6$, and terminal $T_{56}$ to signal output terminal $T_{63}$. The potential difference between terminals $T_{55}$, $T_{56}$ can be disregarded.

The current mirror circuit 1506 is provided with two npn-type bipolar transistors. The emitter of one of these transistors is connected to terminal $T_{58}$, the base to terminal $T_{59}$, and the collector to terminal $T_{60}$. The emitter of the other transistor is connected to terminal $T_{58}$, while the base and collector are connected to terminal $T_{59}$. Terminal $T_{58}$ is connected to terminal $T_6$, and terminal $T_{59}$ to signal output terminal $T_{64}$. The potential difference between terminals $T_{58}$, $T_{59}$ can be disregarded.

There follows a description of the function of the feeder circuit 1500.

The control circuit 130 and regulator 120 allow direct-current electric power output to terminals $T_3$, $T_4$ to be fed from terminals $T_1$, $T_2$ to the subscriber line.

If no current is fed from terminals $T_{61}$–$T_{64}$, there is no continuity between the transistors 1501–1504, as a result of which terminals $T_1$, $T_2$ are disconnected from the regulator 120. Hence, no direct-current power is supplied to the subscriber line.

If a control current is fed from terminals $T_{61}$, $T_{63}$ and not from terminals $T_{62}$, $T_{64}$, there is continuity between the transistors 1501, 1503, but not between the transistors 1502, 1504. As a result, the electric current output by the regulator 120 flows in order from terminal $T_3$ through terminal $T_1$, the subscriber line and terminal $T_2$ to terminal $T_4$.

If a control current is fed from terminals $T_{62}$, $T_{64}$ and not from terminals $T_{61}$, $T_{63}$, there is continuity between the transistors 1502, 1504, but not between the transistors 1501, 1503. As a result, the electric current output by the regulator 120 flows in order from terminal $T_3$ through terminal $T_2$, the subscriber line and terminal $T_1$ to terminal $T_4$.

The current mirror circuits 1505, 1506 convert the unidirectional control signal current in accordance with the control signal current of the transistors D1401, D1402.

In this manner, by virtue of a control current fed to terminals $T_{61}$–$T_{64}$ the feeder circuit 1500 allows terminals $T_1$, $T_2$ to be disconnected from and connected to the regulator 120, or polarity to be reversed.

If common-mode alternating-current induced voltage is impressed on terminals $T_1$, $T_2$, the feeder circuit 1500 functions normally insofar as it is possible to feed the control current to the transistors 1501–1504, which is to say insofar as the current mirror circuits 1505, 1506 function. What is required for the current mirror circuits 1505, 1506 to function is that the potentials $V_1$, $V_2$ of terminals $T_1$, $T_2$ fulfil the inequality $V_1 > V_2$. Under normal design conditions, the feeder circuit 1500 is capable of functioning correctly even if a common-mode alternating-current induced voltage of a magnitude of several tens of volts is impressed on it.

In the present embodiment, the potential difference between terminals $T_{55}$, $T_{56}$ and that between terminals $T_{58}$, $T_{59}$ have been disregarded, but it is also possible to employ transistors which the potential differences cannot be disregarded. It should be noted, however, that the maximum permissible common-mode alternating-current induced voltage will decrease by the combined total of these potential differences.

In each of the above embodiments the description has taken as an example the application of the present invention to a device which feeds power to a subscriber line, but it goes without saying that the present invention may also be applied to devices which feed power for other objects.

In all embodiments from the second to the fifteenth inclusive the examples adduced have employed bipolar transistors, but it is also possible to use unipolar transistors or other active elements.

In all embodiments from the second to the fifteenth inclusive it is also possible to use other types of current mirror circuit, such as Wilson or current amplification compensation types. In addition, it is possible to insert resistances in the emitters in order to improve the precision of the current mirror circuits.

The current mirror circuits employed in all embodiments from the second to the fifteenth inclusive have had a one-to-one current conversion ratio, or ratio of input and output current, but any current conversion ratio is acceptable provided that it fulfils the specifications of the device or system on which the feeder circuit is mounted.

In all embodiments from the second to the fifteenth inclusive the configuration described has involved the detection of signal voltage or signal current, but it is also possible to detect all signals as current. This may be accomplished by removing the resistance between signal detection terminal and power source.

A fly-back, forward or other type of switching regulator 120 may be employed.

Each of the embodiments has employed a switching regulator, but it is also possible to employ a circuit other than a switching regulator provided that it feeds direct-current electric power in an insulated state. Examples include series regulators using transformers based on mutual induction effect, and circuits which apply light to transfer media.

In all embodiments from the fifth to the thirteenth inclusive the configuration has been such that voltage signals are input to the control circuit 130, but other possible configurations involve the use of current signals, optical signals with photocouplers, or digital signals following analogue-digital conversion. The input port of the control circuit 130 can be configured according to the type of input signal.

In the twelfth and thirteenth embodiments, the voltage detection circuit and current detection circuit can be interchanged. What is more, in the twelfth and thirteenth embodiments it is possible to insert choke coils or electronising inductors in desired positions between terminals $T_1$, $T_3$ and between terminals $T_2$, $T_4$.

In the second, third, fourth, twelfth and thirteenth embodiments the current at the resistor 150 has been controlled with a bipolar transistor, and that at the resistor 140 with a current mirror circuit, but it is also possible to utilise other means for control. Examples of such means for control include an operational amplifier.

In the second, third, fourth, twelfth and thirteenth embodiments, resistance levels at the resistors 140, 150 have been the same, but they may also differ, and all that is required is that they are determined in such a manner as to fulfil the conditions of the specifications of the device or system on which the feeder circuit is mounted. Setting different resistance levels at the resistors 140, 150 makes it possible to compensate for imbalances in the subscriber or power supply circuits connected to the subscriber line.

There is no restriction on the type of switch in the fourth and ninth embodiments. Examples which may be adopted include mechanical switches, electromagnetic relays, transistor switches, MOS switches, photocouplers and thyristor switches.

There is no restriction on the type of thyristor in the fourteenth embodiment. Examples which may be adopted include bidirectional thyristors.

Apart from the configurations described in the twelfth and thirteenth embodiments, it is also possible to combine the configurations described in other embodiments.

In the second, third, fourth, twelfth and thirteenth embodiments, the potentials of terminals $T_1$, $T_2$ have both been detected, but it is also possible to detect either of these.

In the fifth, twelfth and thirteenth embodiments, two current mirror circuits 510, 520 have been employed in order to detect the current at the resistor 530 and ensure the equilibrium of the current flowing along the loop. However, one of the current mirror circuits 510, 520 may be replaced with a resistor if all that is required is to detect the current at the resistor 530.

The seventh to eleventh embodiments inclusive and the thirteenth embodiment have been described as configured in order to detect the current between terminals $T_2$, $T_4$, but modifying the connections between the elements 701, 703, 704 705 and the circuits 702, 706 will allow the feeder circuit to be configured so that it is possible to detect the current between terminals $T_1$, $T_3$.

The resistors 140, 150, 530, 540 employed in the second to thirteenth embodiments inclusive may be replaced with other means for current and voltage conversion.

The resistors 530, 601, 602, 606, 611 employed in the fifth to thirteenth embodiments inclusive may be replaced with other means for current and voltage conversion.

The bipolar transistors 220, 603, 606, 608, 610, 1501, 1502, 1503, 1504 employed in the second, third, fourth, sixth to thirteenth inclusive, and fifteenth embodiments may be replaced with other means for switching.

The current mirror circuits employed the second to fifteenth embodiments inclusive may be replaced with other means for current control.

The diodes 310, 411 employed in the third and fourth embodiments may be replaced with other elements or circuits acting in a similar manner to the diodes.

The thyristors 1401–1404 employed in the fourteenth embodiment may be replaced with other means for switching.

As has been described above, the present invention makes it possible to provide a feeder circuit which functions normally even if a common-mode signal of considerable magnitude is impressed on it.

What is claimed is:

1. A feeder circuit comprising:
    a switching regulator that has secondary current input and output terminals and that controls a value of a secondary current in accordance with a value of a primary current;
    a first power supply that has a positive terminal and negative terminal and that supplies said primary current to said switching regulator;
    a regulator controller that controls the value of said primary current flowing in said switching regulator;

a positive output terminal that is connected to said secondary current output terminal of said switching regulator;

a negative output terminal that is connected to said secondary current input terminal of said switching regulator;

a first resistor arranged between said positive output terminal and said negative terminal of said first power supply; and a second resistor located between said negative output terminal and said positive terminal of said first power supply.

2. The feeder circuit according to claim 1, further comprising a detection circuit that detects the current flowing between said negative terminal of said first power supply and said positive output terminal, and detects the current flowing between said positive terminal of said first power supply and said negative output terminal.

3. The feeder circuit according to claim 2, further comprising;

a first negative feedback circuit that detects a potential difference between said positive output terminal and said negative output terminal; and a second negative feedback circuit that detects a current value of said positive output terminal;

wherein said regulator controller controls the value of said primary current according to detect results of said first and second negative feedback circuits.

4. The feeder circuit according to claim 2, further comprising;

a first negative feedback circuit that detects the potential difference between said positive output terminal and said negative output terminal; and a second negative feedback circuit that detects a current value of said negative output terminal;

wherein said regulator controller controls a value of said primary current according to detect results of said first and second negative feedback circuits.

5. The feeder circuit according to claim 1, further comprising a diode circuit having a cathode connected to said secondary current output terminal of said switching regulator, and an anode connected to said secondary current input terminal of said switching regulator.

6. The feeder circuit according to claim 1, further comprising a switching circuit which switches a potential average of said positive and negative output terminal either at approximately the potential average of said positive and negative terminal of said first power supply, or at approximately the potential of said positive terminal of said first power supply.

7. A feeder circuit comprising:

a switching regulator having secondary current input and output terminals and that controls a value of a secondary current in accordance with a value of a primary current;

a first power supply having a positive terminal and a negative terminal and that supplies said primary current to said switching regulator;

a second power supply having a positive terminal and a negative terminal, said negative terminal is connected to said positive terminal of said first power supply;

a regulator controller that controls the value of said primary current flowing in said switching regulator;

a positive output terminal that is connected to said secondary current output terminal of said switching regulator;

a negative output terminal that is connected to said secondary current input terminal of said switching regulator;

a first current mirror circuit having current input terminals connected to said positive output terminal and a first current output terminal connected to said negative terminal of said first power supply; and a second current mirror circuit having current output terminals connected to said negative output terminal and a first current input terminal connected to said positive terminal of said second power supply via a first resistor and a second current input terminal connected to a second current output terminal of said first current mirror circuit via a second resistor;

wherein said regulator controller controls the value of said primary current according to an electric potential of said first current input terminal of said second current mirror circuit.

8. A feeder circuit comprising:

a switching regulator having secondary current input and output terminals and that controls a value of a secondary current in accordance with a value of a primary current;

a first power supply having a positive terminal and a negative terminal and that supplies said primary current to said switching regulator;

a second power supply having a positive terminal and a negative terminal, in which said negative terminal is connected to said positive terminal of said first power supply;

a regulator controller that controls the value of said primary current flowing in said switching regulator;

a positive output terminal that is connected to said secondary current output terminal of said switching regulator;

a negative output terminal that is connected to said secondary current input terminal of said switching regulator;

a first resistor having first and second terminals and that is located between said secondary current output terminal and said positive output terminal;

a second resistor that is located between said secondary current input terminal and said negative output terminal;

a first transistor having one terminal connected to one terminal of said first resistor, and a second terminal and a control terminal connected to said negative terminal of said first power supply via a first direct-current power source;

a second transistor having one terminal connected to said second terminal of said first resistor via a third resistor, a second terminal and a control terminal connected to a terminal of said first direct-current power source;

a first current mirror circuit having first and second current input terminals, the first current input terminal being connected to said second terminal of said second transistor, and having two current output terminals connected to said negative terminal of said first power supply;

a third transistor having one terminal connected a terminal of said second resistor, and a second terminal and control terminal connected to said positive terminal of said second power supply via a second direct-current power source;

a fourth transistor having one terminal connected to said second terminal of said first resistor via a fourth resistor, a second terminal and a control terminal connected to one terminal of said second direct-current power source;

a second current mirror circuit having two current output terminals, a first current output terminal being connected to said second current input terminal of said first current mirror circuit and said second terminal of said fourth transistor, and two current input terminals connected to said positive terminal of said second power supply; and a fifth resistor arranged between a second current output terminal of said second current mirror circuit and said positive terminal of said first power supply;

wherein said regulator controller controls the value of said primary current according to an electric potential of said second current output terminal of said second current mirror circuit.

9. A feeder circuit comprising:

a switching regulator having secondary current input and output terminals and that controls a value of a secondary current in accordance with a value of a primary current;

a first power supply having a positive terminal and a negative terminal and that supplies said primary current to said switching regulator;

a second power supply having a positive terminal and a negative terminal, in which said negative terminal is connected to said positive terminal of said first power supply;

a regulator controller that controls a value of said primary current flowing in said switching regulator;

a positive output terminal that is connected to said secondary current output terminal of said switching regulator;

a negative output terminal that is connected to said secondary current input terminal of said switching regulator;

a first resistor having first and second terminals and that is coupled between said secondary current input terminal and said negative output terminal;

a first current mirror circuit that has four transistors, wherein each current input terminal is connected to said positive terminal of said second power supply;

a first transistor having one terminal connected to said first terminal of said first resistor, and a second terminal and a control terminal connected to a first current output terminal of said first current mirror circuit;

a second transistor having one terminal connected to said second terminal of said first resistor via a second resistor, a second terminal connected to a second current output terminal of said first current mirror circuit, and a control terminal connected to a first current output terminal of said first current mirror circuit;

a second current mirror circuit having one current input terminal connected to a third current output terminal of said first current mirror circuit, a second current input terminal connected to said positive output terminal, and two current output terminals connected to said negative terminal of said first power supply; and a third resistor that is coupled between a fourth current output terminal of said first current mirror circuit and said positive terminal of said first power supply;

wherein said regulator controller controls the value of said primary current according to an electric potential of said fourth current output terminal of said first current mirror circuit.

10. The feeder circuit according to claim 9, further comprising:

a fourth resistor that is located between said positive terminal of said second power supply and said first terminal of said first transistor.

11. The feeder circuit according to claim 9, further comprising:

a signal output terminal that is connected to said fourth current output terminal of said first current mirror circuit; and a dynamic range adjustment circuit that switches a range of a current of said signal output terminal.

12. The feeder circuit according to claim 9, further comprising a fifth transistor which is located between said second current output terminal of said first current mirror circuit and said one terminal of said second transistor, and a control terminal connected to said first current output terminal of said first current mirror circuit.

13. The feeder circuit according to claim 9, further comprising a fifth transistor in which one terminal is connected to said positive terminal of said first power supply, a second terminal is connected to said control terminals of said first and second transistors and a control terminal is connected to said one terminal of said first transistor.

14. A feeder circuit comprising:

a switching regulator that controls a value of secondary current in accordance with a value of a primary current;

a first power supply that supplies said primary current to said switching regulator;

a regulator controller that controls the value of said primary current flowing in said switching regulator;

a first thyristor having a cathode connected to a positive output terminal, a gate terminal, and an anode connected to a secondary current output terminal of said switching regulator;

a second thyristor having a cathode connected to a negative output terminal, a gate terminal and an anode connected to said secondary current output terminal of said switching regulator;

a third thyristor having a cathode connected to a secondary current input terminal of said switching regulator, an anode connected to said negative output terminal and a gate connected to a first control terminal;

a fourth thyristor having a cathode connected to said secondary current input terminal of said switching regulator, an anode connected to said positive output terminal and a gate is connected to a second control terminal;

a first current mirror circuit having one current input terminal connected to said gate terminal of said first thyristor, a second current input terminal connected to a third control terminal and two current output terminals connected to a negative terminal of said first power supply; and a second current mirror circuit having one current input terminal connected to said gate terminal of said second thyristor, a second current input terminal connected to a fourth control terminal and two current output terminals connected to said negative terminal of said first power supply.

15. A feeder circuit comprising:

a switching regulator that controls a value of secondary current in accordance with a value of a primary current;

a first power supply that supplies said primary current to said switching regulator;

a regulator controller that controls said value of said primary current flowing in said switching regulator;

a first transistor having one terminal connected to a secondary current output terminal of said switching regulator and a second terminal connected to a positive output terminal;

a second transistor having one terminal connected to said secondary current output terminal of said switching regulator and a second terminal connected to a negative output terminal;

a third transistor having one terminal connected to said negative output terminal, a second terminal connected to said secondary current input terminal o f said switching regulator and a gate connected to a first control terminal;

a fourth transistor having one terminal connected to said positive output terminal, a second terminal connected to said secondary current input terminal of said switching regulator and a gate connected to a second control terminal;

a first current mirror circuit having one current input terminal connected to gate terminal of said first transistor, a second current input terminal connected to a third control terminal and two current output terminals connected to a negative terminal of said first power supply; and a second current mirror circuit having one current input terminal connected to a gate terminal of said second transistor, a second current input terminal connected to a fourth control terminal and two current output terminals connected to said negative terminal of said first power supply.

* * * * *